(12) United States Patent
Walley et al.

(10) Patent No.: US 11,101,674 B2
(45) Date of Patent: Aug. 24, 2021

(54) BATTERY CHARGING ARCHITECTURES

(71) Applicant: Avago Technologies General IP (Singapore) Pte. Ltd., Singapore (SG)

(72) Inventors: John S. Walley, Ladera Ranch, CA (US); Michael Braiman, Windsor, CO (US); Jay E. Ackerman, Fort Collins, CO (US); John L. McNitt, Fort Collins, CO (US); Arun Palaniappan, Longmont, CO (US); Rishi Agarwal, Irvine, CA (US); Marc Keppler, Windsor, CO (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 296 days.

(21) Appl. No.: 15/669,859

(22) Filed: Aug. 4, 2017

(65) Prior Publication Data

US 2018/0041060 A1 Feb. 8, 2018

Related U.S. Application Data

(60) Provisional application No. 62/371,703, filed on Aug. 5, 2016.

(51) Int. Cl.
| | |
|---|---|
| *H02J 7/00* | (2006.01) |
| *H02M 3/07* | (2006.01) |
| *H02M 3/335* | (2006.01) |
| *H02J 7/02* | (2016.01) |
| *H02J 50/00* | (2016.01) |

(52) U.S. Cl.
CPC .............. *H02J 7/0045* (2013.01); *H02J 7/00* (2013.01); *H02M 3/07* (2013.01); *H02M 3/33523* (2013.01); *H02J 7/022* (2013.01); *H02J 7/025* (2013.01); *H02J 50/00* (2016.02); *H02J 2207/20* (2020.01); *H02J 2207/40* (2020.01)

(58) Field of Classification Search
CPC ...... H02J 7/0045; H02J 7/0052; H02J 7/0055; H02J 7/022; H02J 7/025; H02J 7/00; H02J 50/00; H02J 2007/0059; H02J 2007/0062; H02M 3/07; H02M 3/33523; H02M 3/335
USPC ....................................................... 320/107
See application file for complete search history.

(56) References Cited

U.S. PATENT DOCUMENTS

| | | | | |
|---|---|---|---|---|
| 4,973,896 | A | * | 11/1990 | Shiga ..................... H02J 7/1438 290/40 C |
| 6,064,582 | A | * | 5/2000 | Luchner .................. H02M 3/07 307/110 |

(Continued)

*Primary Examiner* — Richard Isla
*Assistant Examiner* — Dung V Bui
(74) *Attorney, Agent, or Firm* — Morgan, Lewis & Bockius LLP

(57) ABSTRACT

A system may include an adapter, a charger, and a connector. The adapter is configured to receive an alternating current (AC) signal and generate an adapter signal, the adapter signal being generated based on an up-conversion of the AC signal. The charger is configured to generate a direct current (DC) signal from the adapter signal using one or more energy storage elements and supply the DC signal to a load, in which the adapter signal has a voltage greater than that of the DC signal. The connector is configured to couple the adapter and the charger. In some aspects, the adapter signal is adjusted based on one or more measurements of the DC signal at an output of the charger to maintain a target power for charging the load.

20 Claims, 16 Drawing Sheets

(56) References Cited

U.S. PATENT DOCUMENTS

| | | | | |
|---|---|---|---|---|
| 6,137,280 A * | 10/2000 | Ackermann | H02J 7/00 | 323/354 |
| 7,851,941 B2 * | 12/2010 | Walley | H02M 3/1582 | 307/18 |
| 8,525,487 B1 * | 9/2013 | Stevenson | H02J 7/0063 | 320/166 |
| 9,595,841 B2 * | 3/2017 | Shimada | H02M 3/33584 | |
| 2002/0051372 A1 * | 5/2002 | Hoshino | H02M 3/07 | 363/60 |
| 2004/0246635 A1 * | 12/2004 | Morita | H02J 7/0016 | 361/1 |
| 2005/0073866 A1 * | 4/2005 | Cummings | H02M 3/1588 | 363/63 |
| 2008/0158915 A1 * | 7/2008 | Williams | H02M 3/07 | 363/21.06 |
| 2008/0169705 A1 * | 7/2008 | Tan | H01M 10/44 | 307/66 |
| 2008/0238383 A1 * | 10/2008 | Watanabe | H02M 1/32 | 323/271 |
| 2009/0059630 A1 * | 3/2009 | Williams | H02M 3/07 | 363/60 |
| 2010/0202161 A1 * | 8/2010 | Sims | H02M 7/02 | 363/20 |
| 2012/0170323 A1 * | 7/2012 | Iida | H02J 7/025 | 363/16 |
| 2012/0299553 A1 * | 11/2012 | Menegoli | H02J 2207/20 | 320/140 |
| 2013/0015820 A1 * | 1/2013 | Kim | H02J 7/0019 | 320/128 |
| 2013/0015821 A1 * | 1/2013 | Kim | H02J 7/0019 | 320/128 |
| 2013/0181521 A1 * | 7/2013 | Khlat | H02M 3/07 | 307/31 |
| 2013/0342171 A1 * | 12/2013 | Grivas | H02J 7/0031 | 320/137 |
| 2014/0184140 A1 * | 7/2014 | Lee | H02M 3/1582 | 320/103 |
| 2014/0218987 A1 * | 8/2014 | Hu | H02M 1/4225 | 363/126 |
| 2014/0226377 A1 * | 8/2014 | Goetz | H02M 3/158 | 363/65 |
| 2014/0239885 A1 * | 8/2014 | Yang | H02J 7/0077 | 320/107 |
| 2014/0266011 A1 * | 9/2014 | Mehta | H02J 7/0042 | 320/107 |
| 2014/0285241 A1 * | 9/2014 | Umetani | H03K 17/162 | 327/109 |
| 2014/0306673 A1 * | 10/2014 | Le | H02M 3/156 | 323/266 |
| 2014/0313794 A1 * | 10/2014 | Ono | H02M 3/33523 | 363/21.15 |
| 2015/0015071 A1 * | 1/2015 | Deboy | H02M 3/335 | 307/31 |
| 2015/0015204 A1 * | 1/2015 | Sorias | H02J 7/0044 | 320/111 |
| 2015/0061613 A1 * | 3/2015 | Kondou | H02M 3/158 | 323/271 |
| 2015/0155895 A1 * | 6/2015 | Perreault | H04B 1/0458 | 455/127.3 |
| 2015/0263612 A1 * | 9/2015 | Wu | H02M 3/07 | 323/312 |
| 2016/0079794 A1 * | 3/2016 | Cho | H02J 50/40 | 320/108 |
| 2016/0172889 A1 * | 6/2016 | Kim | H02J 50/001 | 320/107 |

\* cited by examiner

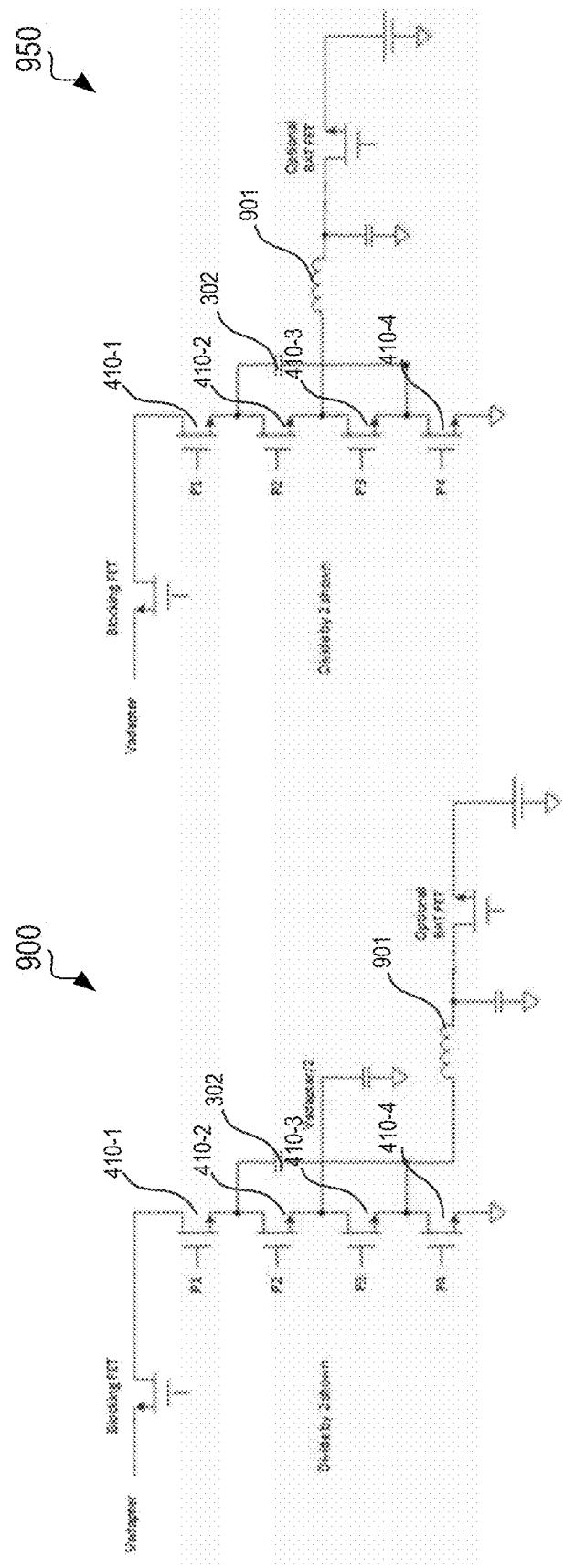

BATTERY CHARGING ARCHITECTURES

CROSS-REFERENCE TO RELATED APPLICATIONS

The present application claims the benefit of priority under 35 U.S.C. § 119 from U.S. Provisional Patent Application Ser. No. 62/371,703 entitled "BATTERY CHARGING ARCHITECTURES," filed on Aug. 5, 2016, the disclosure of which is hereby incorporated by reference in its entirety for all purposes.

TECHNICAL FIELD

The present disclosure relates to electronic devices, and more particularly to battery charging architectures.

BACKGROUND

A charging architecture for charging a battery (e.g., of a mobile phone, tablet, etc.) may include an adapter for receiving an alternating current (AC) signal and generating an adapter output, a charger for generating a direct current (DC) signal based on the adapter signal, and a cable for transmitting the adapter output to the charger. The charger may supply the DC signal to a battery.

BRIEF DESCRIPTION OF THE DRAWINGS

Certain features of the subject technology are set forth in the appended claims. However, for purpose of explanation, several embodiments of the subject technology are set forth in the following figures.

FIGS. 9A and 9B illustrate examples of an integrated charger architecture in accordance with one or more implementations.

DETAILED DESCRIPTION

Figure 1:
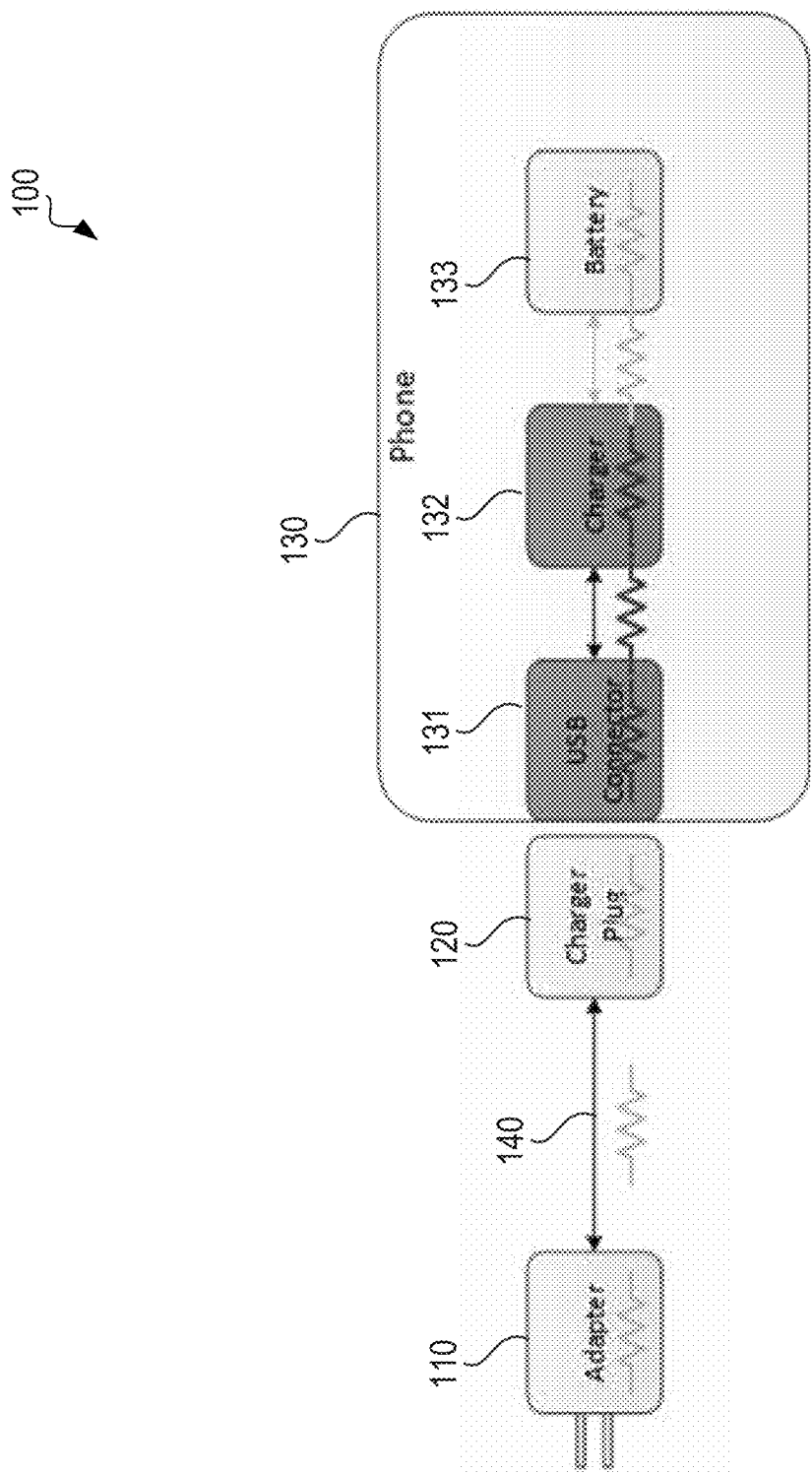
FIG. 1 illustrates an example of a traditional charging architecture in accordance with one or more implementations.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

In one or more implementations, a capacitive buck converter design may be utilized for charging batteries. In some aspects, such a design may provide very high efficiency at high-charge currents. In some cases, heat generation may be a limiting factor in charging devices (e.g., phone batteries) quickly. The capacitive buck design may allow for highest power transfer efficiency for battery charging at high current levels and with low component height restrictions (e.g., in mobile phones). In some cases, the design may also allow smaller board area, and BOM as capacitors may have higher energy density and may be cheaper (e.g., than inductors). In contrast, in some cases, traditional battery charging architectures may utilize inductive buck techniques. Such architectures may be associated with power losses from the inductor at very high charge currents, even with silicon technologies such as gallium nitride. In smaller devices (e.g., mobile phones), the size of the devices may place a constraint on the size of the inductor.

The subject technology provides for a fast battery charging architecture where power losses are shifted from a load device to an external adapter that is configured to supply a charge voltage to the load device, thus reducing the amount of heat generated at the load device. In some aspects, the fast battery charging architecture of the subject technology can allow for a battery to be charged using current at or above 6 amperes while minimizing conduction losses throughout the system. In some implementations, a system may include an adapter, a charger, and a connector. The adapter is configured to receive an alternating current (AC) signal and generate an adapter signal, the adapter signal being generated based on an up-conversion of the AC signal. The charger is configured to generate a direct current (DC) signal from the adapter signal using one or more energy storage elements and supply the DC signal to a load, in which the adapter signal has a voltage greater than that of the DC signal. The connector is configured to couple the adapter and the charger. In some aspects, the adapter signal is adjusted based on one or more measurements of the DC signal at an output of the charger to maintain a target power for charging the load.

The capacitive buck converter design may utilize external floating capacitors. In an aspect, such capacitive techniques may allow higher efficiency (e.g., greater than 97% efficiency) at currents in the range of about 6 amperes to 8 amperes. The capacitive techniques may be utilized in conjunction with an adapter that provides an adjustable voltage or current to the capacitive buck input (e.g., to allow highest efficiency). In one aspect, a universal serial bus (USB) cable (e.g., USB 3.1 type C with power delivery) and/or other fast charger adapters may be utilized to provide such a capability.

FIG. 1 illustrates an example of a traditional charging architecture 100 in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The charging architecture 100 may be, and/or may include, a wireless connection and/or a wired connection. The charging architecture 100 includes an adapter 110, a charger 120, an electronic device 130, and a connector 140. The adapter 110 may be an alternating current (AC) adapter, AC/direct current (DC) adapter, or AC/DC converter. The charger 120 may be an adaptable power source that supplies an operational voltage to a battery. The electronic device 130 may be, or may include, a client device, such as wired and/or wireless devices (e.g., mobile phone, tablet, camera, flash drive, laptop, keyboard, mouse, display, etc.), or may be a battery-operated device implemented within a vehicle, such as a passenger car.

The connector 140 may include a wired interface device, such as a USB connector such as Type A USB (USB-A) or Type C USB (USB-C), that may facilitate communication between connected devices. In other aspects, the connector 140 may include a wireless interface device such as a wireless power transfer device. The connector 140 may support a current in a range of about 1 ampere to 8 amperes in some implementations, and a current in a range of about 8 amperes to 30 amperes in other implementations. In some aspects, the connector 140 as a USB-C connector may support a current in a range of about 3 amperes to 5 amperes. One or more of the adapter 110, the charger 120 and the electronic device 130 may be and/or may include all or part of the electronic system discussed below with respect to FIG. 15.

In some implementations, the electronic device 130 includes a device connector 131, a device charger 132 and a battery 133. The device connector 131 may include a USB connector that may facilitate communication to an auxiliary charger (e.g., the charger 120). The device charger 132 may supply the battery 133 with a voltage for operational use by the battery 133 in some implementations, or may receive the operational voltage from the charger 120 and pass through the received voltage to the battery 133 in other implementations.

In FIG. 1, conduction losses (or device dissipation) in the charging architecture 100 can be experienced along the connector 140 between the adapter 110 and the charger 120 and further experienced inside the electronic device 130 between the device connector 131 and the battery 133. In this example, printed wiring board (PWB) routing losses can be experienced between the device connector 131 and the device charger 132.

For fast charging in small electronic architectures, power needs to be delivered with significant efficiency (e.g., at or near 100% efficiency) because any conduction losses creates heat and, thus, resulting in power loss in the system. For example, if 24 watts of power needs to be delivered to a mobile device (e.g., the electronic device 130) and the input voltage to the load is set to about 4 volts, then a fast charging system would require about 6 amperes of current. In this example, losses due to adapter cables (e.g., the connector 140) can produce about 3.6 watts of heat, where the cables may have about 100 m-ohms of impedance. Additionally, additional losses due to mobile device connectors (e.g., device connector 131) can produce about 1 watt of heat, where the connectors may have about 30 m-ohms of impedance.

Figure 2:
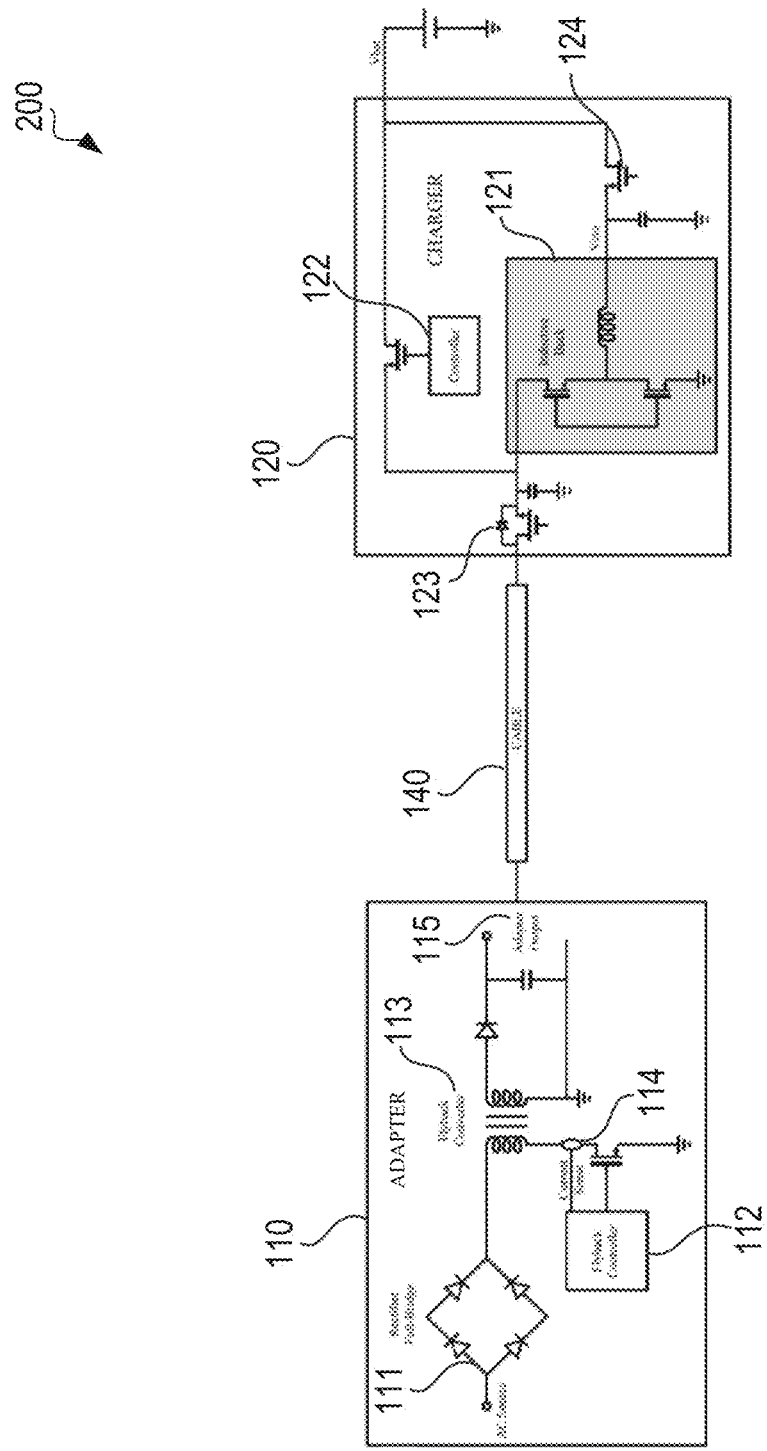
FIG. 2 illustrates an example of a traditional switched inductor based charging architecture in accordance with one or more implementations.

FIG. 2 illustrates an example of a traditional switched inductor based charging architecture 200 in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The charging architecture 200 includes the adapter 110, the charger 120, and the connector 140. In FIG. 2, the connector 140 is depicted as a cable such as a USB cable. The adapter 110 may be coupled to an AC source on one end and to the connector 140 on another end. The adapter 110 may include a rectifier circuit 111, a flyback controller 112, a flyback converter 113, one or more transistors, one or more diodes, and one or more capacitors. The rectifier circuit 111 may convert the AC source to DC. In some aspects, the adapter output 115 may be up-converted from an AC signal of the AC source. The flyback converter 113 may be an isolated power converter such as a buck-boost converter with an inductor split to form a transformer. The capacitor(s) may be utilized to generate an adapter output 115 (or adapter signal) that is coupled to the connector 140. The flyback controller 112 may be configured to sense a current at a node of the primary winding of the transformer in the flyback converter 113, and provide a control signal to a transistor that is series-connected to the primary winding based on the sensed current in order to control the adapter output 115. For example, the transistor may be turned off when the sensed current reaches a predetermined current level, thereby causing the primary winding side to become an open circuit and the secondary winding side of the transformer supplies the current through a forward-biased diode to an output capacitor that is coupled across the adapter output 115. In this respect, a time varying voltage may be applied to the input of the charger 120 via the connector 140. In some aspects, the adapter output 115 is set near an operational voltage level for the battery 133 (e.g., $V_{bat}$). The charger 120 may include one or more pass gates (e.g., 123, 124), an inductive buck converter 121, and a controller 122. The charger 120 may generate and/or supply a current $I_{chg}$ to be provided to a load (e.g., the battery 133). In some aspects, the pass gates 123 and 124 may be transistors such as complementary-metal-oxide semiconductors (CMOS) or other types of semiconductor devices. In one or more aspects, the battery 133 may be pre-charged to a predetermined voltage (e.g., 3.0 V) using a trickle charge.

The charging architecture 200 may minimize conduction losses by having the input voltage to the battery 133 raised to a certain predetermined level. When the voltage is raised to satisfy the same amount of charging power as in the charging architecture 100, the current is decreased (hence conduction losses also decrease). In this respect, the raised input voltage has to be downconverted to an operating voltage of the battery 133 for use by the battery 133. However, downconversion of voltages results in significant losses as well. A step-down power converter such as the inductive buck converter 121 can be used to down-convert (or step down) voltages. The inductive buck converter 121 may serve as a switching regulator to support non-compliant adapters. For example, the inductive buck converter 121 may support legacy USB voltages. However, the efficiency ratios of inductive buck converters may not be sufficient to minimize heat generation due to inductive losses. Such architectures may be associated with power losses from the inductor at very high charge currents, even with silicon technologies such as gallium nitride. For example, an inductive buck converter may yield about 95% efficiency, but the 5% loss in efficiency yields about 1 watt of heat loss. In smaller devices (e.g., mobile phones), the size of the devices may place a constraint on the size of the inductor.

The operational voltage for the battery 133 may be measured and adjusted to maintain the adapter output 115 at or near the battery operational voltage. For example, the charge current may be monitored during the charging phase of the battery 133 and the measured current may be used to adjust the adapter output 115 as necessary. The charge current $I_{chg}$ may be monitored at least once in a specific duration of time, periodically, or monitored continuously depending on implementation. The charge current $I_{chg}$ may be monitored at an input node to the electronic device 130 from the adapter output 115 (not shown) in some implementations, or at an intermediate node along a conduction path to the battery 133 inside the electronic device 130 in other implementations. The communication between the adapter 110 and the electronic device 130 may coexist through a dedicated transmission path (e.g., a USB charge current pin).

The charging architecture 200 provides two conduction paths to the battery 133 that may be selected individually in a dual-mode operation of the charger 120. The first conduction path traverses the inductive buck converter 121 to provide a slow charge path. Given that inductors have small height restrictions, the inductors may not store a large amount of power in an x-y footprint, thereby limiting the amount of current that can run through the first conduction path. The second conduction path traverses the controller 122 to provide a fast charge path.

In operation, the pass gate 123 is turned fully on as a steady-state signal to minimize the path resistance through the pass gate 123 and the power dissipation in the electronic device 130 by minimizing the amount of switching loss through the pass gate 123. In one or more aspects, the total path resistance $R_{drop}$ for each of the two conduction paths is measured. In this respect, the path with the least amount of conduction loss is selected.

As described above, inductors have very small height requirements in mobile devices (e.g., less than 2 μm), and if the inductors need to store a significant amount of energy, the dimensions of the inductor increase significantly in the x and y directions. As such, the inductors reach saturation due to the dimension restrictions and, thus, the power conversion efficiency is reduced. Alternatively, the inductive buck converter 121 can be multi-phased, where multiple instances of the inductive buck converter 121 run in parallel of one another with different phases. The challenge, however, with a multi-phase implementation is that the saturation and system losses increase significantly. For example, the power losses and switching losses multiply depending on the number of inductive buck converters implemented and, thus, the efficiency is reduced.

To obtain at least 98% efficiency from the charging architecture 200, a bypass mode for a fast charge is provided by traversing the second conduction path. In this path, the inductive buck converter 121 is bypassed to support a high current transmission to the battery 133 and, thereby charge the battery 133 in less time. In this implementation, the adapter output 115 may be configured to match (or at least correspond to) the operational voltage needed to charge the battery 133. Otherwise, for a normal charge (or slow charge), the inductive buck converter 121 can be traversed over the first conduction path.

In some implementations, the voltage applied at the adapter output 115 through the second conduction path may be fixed to a voltage that is the sum of the measured battery operational voltage and the amount of voltage loss at the maximum charge current during a charge current mode. In other implementations, the voltage applied at the adapter output 115 through the second conduction path may be periodically stepped to a voltage that is the sum of the measured battery operational voltage and the amount of voltage loss at a desired charge current during a charge voltage mode. The duration of the charge current mode and charge voltage mode is individually predetermined in some implementations, and arbitrary in duration in other implementations. The charge current mode and the charge voltage mode may operate in succession of one another without discontinuity in some implementations, or may operate at different times in discontinuous successions in other implementations. The amount of voltage that may be applied to the first conduction path for the slow charge mode may be smaller than that of the second conduction path based on a charge at a lower current through the inductive buck converter 121.

In some implementations, the charging architecture 200 may limit the amount of current transmitted to the charger 120 as opposed to the voltage as described above. The flyback controller 112 may be configured to provide a constant charge current $I_{chg}$. In this respect, the adapter output 115 represents a programmable current limited output. In this implementation, the pass gates 123 and 124 may be turned on (and kept on) for the fast charge mode, thereby minimizing any switching losses through the pass gates 123 and 124. The charger controller 122 may be configured to control the second conduction path such that the charge current is provided to the battery 133 as a periodic pulse signal. In the charge current mode, the charger controller 122 turns a pass gate on to allow the charge current to pass through the second conduction path without discontinuity such that the charge current is sent to the battery 133 as a steady-state signal. In other implementations, the charge current may be stepped down (or decreased) over one or more cycles if the battery 133 is charging too quickly. In this respect, the charger may enter the charge voltage mode and the charger controller 122 may control the pass gate such that the charge current to the battery 133 is pulsed to reduce the average charge current. The charger may remain in the charge voltage mode until the average charge current is decreased to a desired level such as a nominal battery operational voltage (e.g., 3.8 V) in some implementations, or may be returned to the charge current mode after a predetermined duration in other implementations.

Another approach to minimize the conduction losses while minimizing losses resulting from the downconversion is the implementation of a capacitive buck converter as a charger as will be discussed below in FIG. 3. For efficiency, the ratio of the input voltage to the output voltage may need to remain as a fractional ratio, where the efficiency increases as the ratio approaches an integer value depending on the number of capacitors in the capacitive buck converter. However, voltage requirements change over time for battery charging architectures. In this respect, the capacitive buck converter may be coupled to a system around the capacitive buck converter to keep the charge voltage efficient over time. In some aspects, the input voltage to the charger may be micro-adjusted at the end of the adapter, and/or a pass gate may be applied to the output of the charger to adjust the amount of impedance, and thereby adjust the amount of charge voltage and/or charge current to the battery 133.

Figure 3:
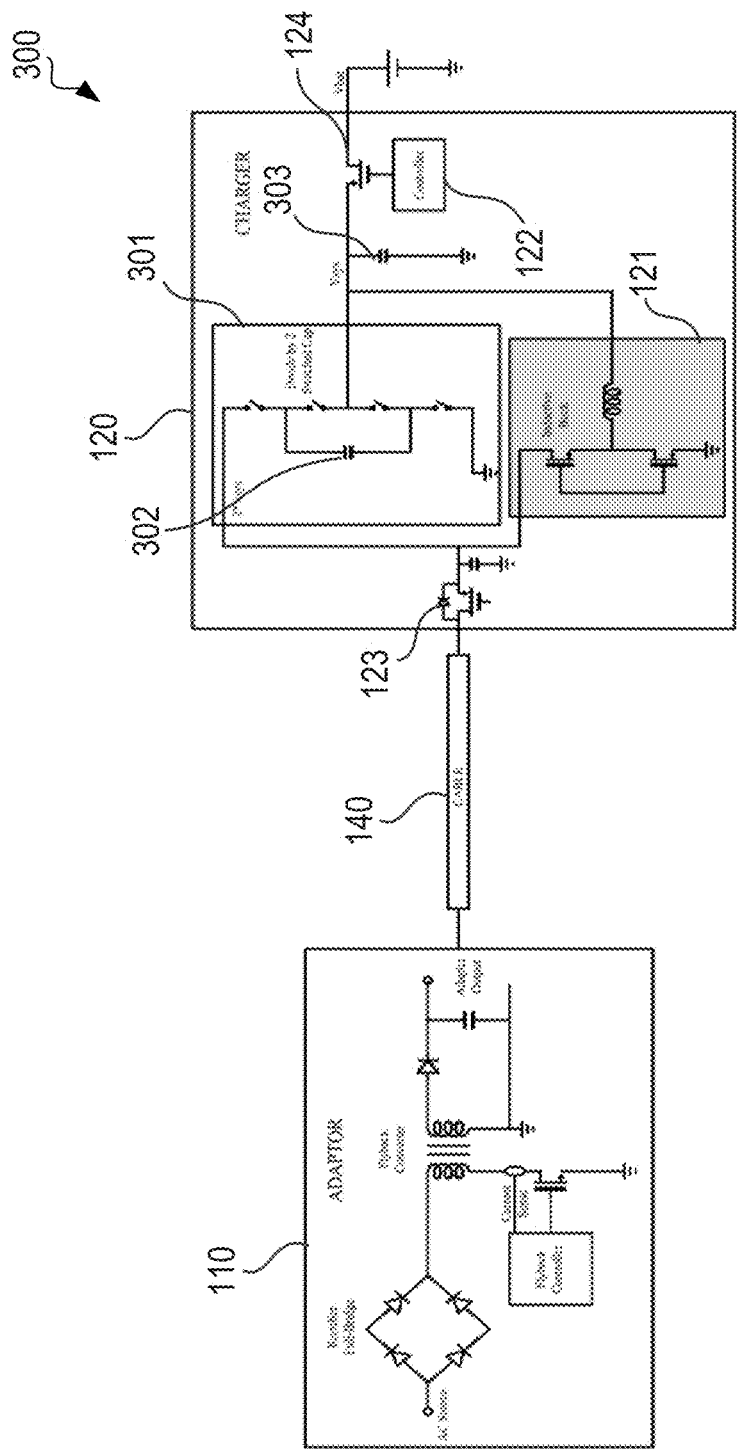
FIG. 3 illustrates an example of a switched capacitor based charging architecture in accordance with one or more implementations.

FIG. 3 illustrates an example of a switched capacitor based charging architecture 300 in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The adapter 110 of FIG. 3 contains components similar to those shown in the adapter 110 of FIG. 2. In FIG. 3, the charger 120 may be a switched-capacitor high-voltage charger. The charger 120 includes a capacitive buck converter 301. The capacitive buck converter 301 includes a network of serially-connected switches and a capacitor 302 that is selectively coupled to the network of serially-connected switches. The various switches of the network of serially-connected switches may be 2.5 mΩ external devices (e.g., transistor devices, field effect transistor (FET) devices). The capacitor 302 may be about 1 μF, where the capacitance size may be based on the amount of energy needed to be stored. In some aspects, the size of the capacitor 302 may be reduced when the frequency increases for a given energy (e.g., $f \cdot 1/2cv^2 = \varepsilon$). The capacitor(s) of the capacitive buck converter 301 can have higher energy densities than the inductor(s) of the inductive buck converter 121 and, thus, the capacitive buck converter 301 allows for a reduction in cable and connector losses since the charger 301 may support higher current output from the capacitive buck converter 301.

The capacitive buck converter 301 may be passive linear circuit that is configured as a voltage divider. In FIG. 3, the voltage divider of the capacitive buck converter 301 may be depicted as a divide-by-two capacitive divider, however, the ratio of the input voltage to the output voltage may be any other arbitrary number depending on implementation. In some aspects, the capacitive buck converter 301 may provide non-overlapped phase transitions between the switches such that the capacitive buck converter 301 operates in two modes (or phases). For example, a first subset of switches are closed during a first phase such that the capacitor 302 is electrically coupled in series with an output capacitor 303, and a second subset of switches (different from the first subset of switches) are closed during a second phase such that the capacitor 302 is electrically coupled in parallel to the output capacitor 303. In either mode, the divide ratio of the input voltage to the output voltage may be maintained (e.g. divide-by-two). This is done to keep the output voltage stable over time, but the output voltage may be regulated (e.g., decreased) based on a change in the switching sequence. The capacitive buck converter 301 may operate as a function of switching frequency (e.g., about 1 MHz) in some implementations, or as a function of switching resistance in other implementations. In this respect, the output voltage may be regulated as a function of frequency and/or resistance and/or sequence. The switching frequency can also be modified to adjust the switching losses. For example, the switching frequency can be reduced when the load impedance is relatively high to achieve higher efficiency.

In operation, the adapter 110 provides a programmable output voltage that is set to about two times the battery operational voltage (e.g., $2*V_{bat}$) at the adapter output 115. In this respect, the charge current applied to the connector 140 is about one-half of the charge current for expected power at the battery 133. At the charger 120, the applied voltage can be downconverted with lesser conduction losses using the capacitive buck converter 301, and further micro-tuned by the charger controller 122 at the output of the charger 120. In this respect, the power dissipation can be shifted toward the adapter 110 and thereby minimizing the conduction losses observed at the charger 120 and the electronic device 130.

Figure 4:
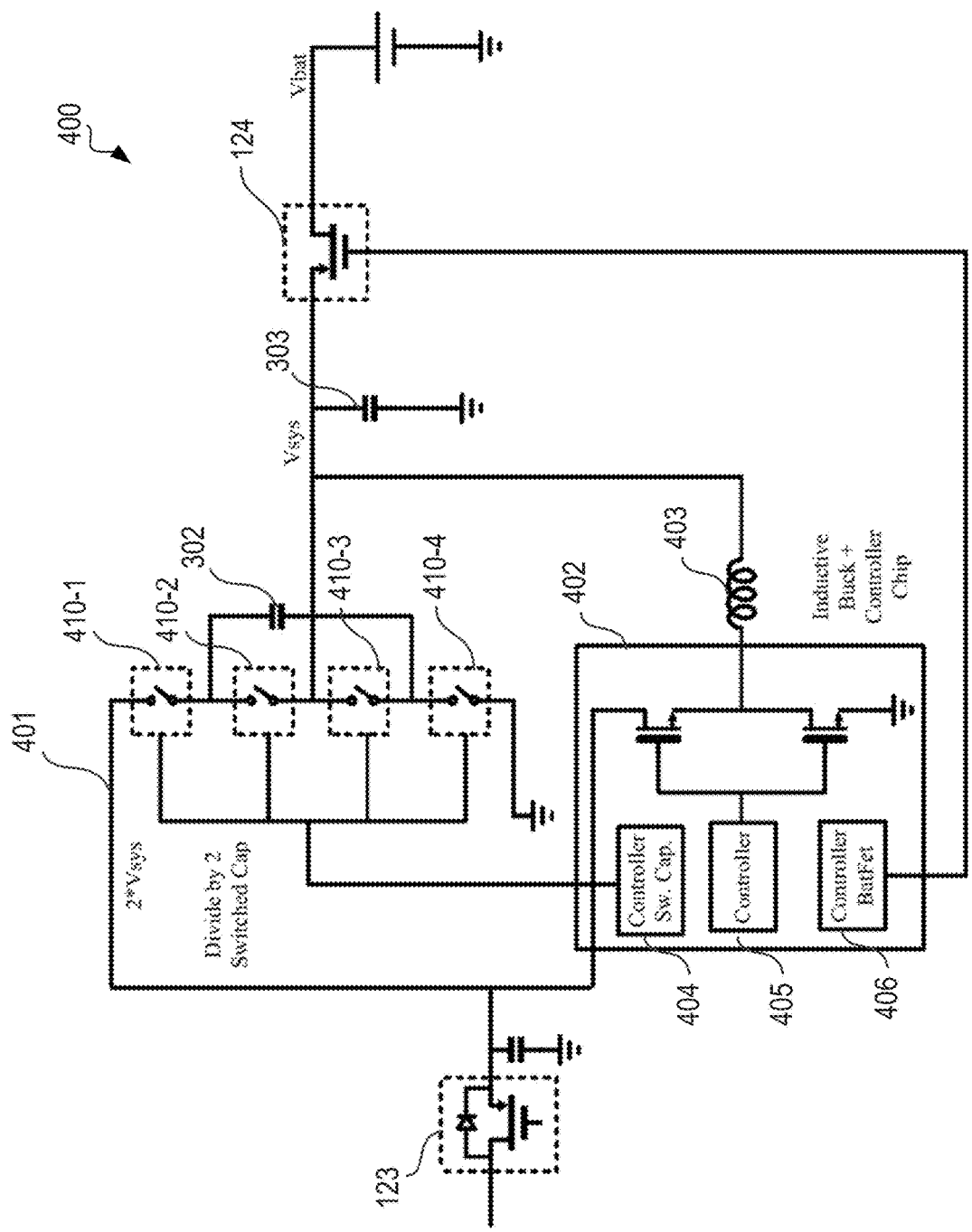
FIG. 4 illustrates an example of a charger architecture in accordance with one or more implementations.

FIG. 4 illustrates an example of a charger architecture 400 in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The charger architecture 400 of FIG. 4 contains components similar to those shown in the charger 120 of FIG. 3. The charger architecture 400 includes a capacitive buck converter 401 that includes a network of series-connected switches 410-1, 410-2, 410-3 and 410-4. The number of switches depicted in the charger architecture 400 are not limited to the number shown, and the number of switches included in the capacitive buck converter 401 can be arbitrary depending on implementation. In some aspects, the switches (e.g., 410-1, 410-2, 410-3, 410-4) may be controlled by a control signal originating from a switched capacitor controller 404. The switched capacitor controller 404 may include a state machine with non-overlapped transfer functions. For example, in a first phase, the switches 410-1 and 410-3 are turned on (and the switches 410-2 and 410-4 are open) to short the capacitor 302 in series with the output capacitor 303. The output voltage is then tapped at a virtual ground node between the capacitor 302 and the output capacitor 303. In a second phase, the switches 410-2 and 410-4 are turned on (and the switches 410-1 and 410-3 are open) to short the capacitor 302 in parallel to the output capacitor 303.

The pass gates 123 and 124 may be 2.5 mΩ external devices such as CMOS transistors. The pass gate 123 is coupled to the input of the capacitive buck converter 401 and to the input of the inductive buck converter 402. The pass gate 123 may be coupled in parallel to a diode (as a reverse-biased diode) that is configured to prevent current leakage from either the capacitive buck converter 401 or the inductive buck converter 402 to the connector 140. In operation, the pass gate 123 is turned on to allow current to flow through the charger 120 to minimize conduction losses through the pass gate 123. The pass gate 124 is coupled to the outputs of the capacitive buck converter 401 and the inductive buck converter 402. The pass gate 124 may be configured to control the amount of impedance applied to the output such that the desired charge current to the battery 133 can be calibrated. The pass gate 123 may be controlled by a control signal from a battery gate controller 406, which may be coupled to the gate node of the pass gate 124. In some aspects, the battery gate controller 406 may receive control signaling and/or other signaling from the adapter 110 such that the control signal from the battery gate controller 406 can be adjusted based on whether the programmable voltage from the adapter 110 fully generates the charge current as desired. The inductive buck converter 402 includes transistors connected in series, where an inductor is coupled to an output of the transistors (e.g., tapped at a virtual ground node between the transistors). The inductor may be part of the inductive buck converter 402 on a same semiconductor die in some implementations, or may be external to the inductive buck converter 402 on a different semiconductor die in other implementations. In some aspects, the transistors may be controlled by a control signal from a switched inductor controller 405, which may be coupled to the gate notes of the series-connected transistors. In one or more implementations, the switched capacitor controller 404, the switched inductor controller 405 and the battery gate controller 406 may be formed as part of the inductive buck converter 402 such that the controllers are on a same semiconductor die. In other implementations, the switched capacitor controller 404, the switched inductor controller 405 and the battery gate controller 406 are formed on a separate semiconductor die from the inductive buck converter 402.

In some implementations, the pass gate 124 is not present in the conduction path from the capacitive buck converter 401 to the battery 133. Rather, a pass gate may be implemented inside the capacitive buck converter 401 that functions to save PWB area and improve efficiency. In one or more implementations, the capacitive buck converter 401 may operate in the charge current mode, whereas the inductive buck converter 402 operates in the charge voltage mode and low battery mode. In some aspects, the inductor 403 may include one or more ferrite bead inductors that are about 10 nH of inductance to reduce the capacitor sizes of about 50 µF. This would help reduce any ripple effect in the electrical signal and the use of smaller capacitors in the order of about 10 µF and, thus, creating a savings in PWB area.

Figure 5:
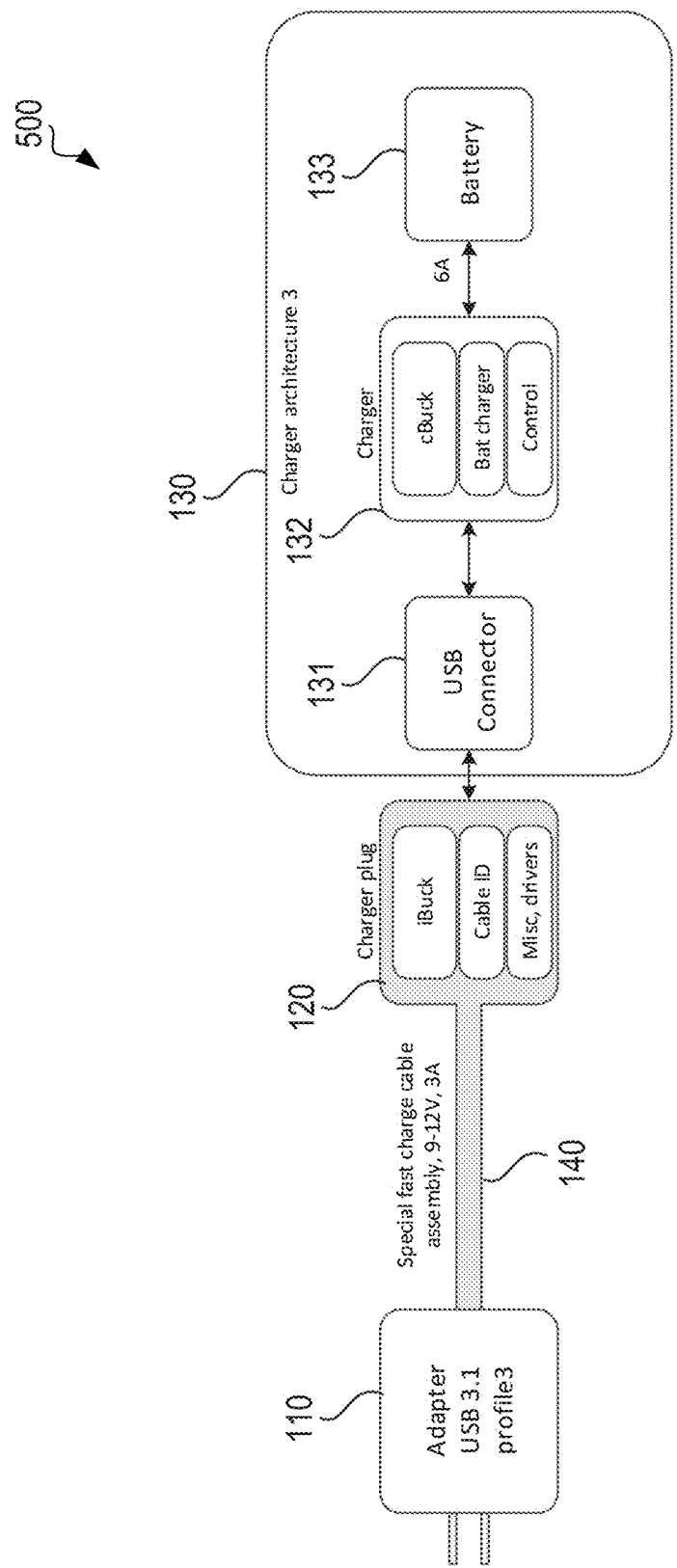
FIG. 5 illustrates an example of a charging architecture with a charger plug in accordance with one or more implementations.

FIG. 5 illustrates an example of a charging architecture 500 with a charger plug in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The charging architecture 500 of FIG. 5 contains components similar to those shown in the charging architecture 100 of FIG. 1. The advantages depicted by the arrangement of components in FIG. 5 are based on the heat dissipation distribution across the system with the highest efficiency possible. The charging architecture 500 includes a charging plug that represents an enhanced version of the charger 120. The adapter 110 may be a standard type-C USB adapter. The connector 140 may be a standard cable that serves as a special fast charge cable. The connector 140 may support a current of 3 amperes with the custom charger plug on one end of the connector 140 that is coupled to the input of the device connector 131. The voltage applied to the connector 140 may be in the range of 9 V to 12 V.

The charger plug may house an inductive buck converter (e.g., 121) with a variable output voltage that provides an efficiency in the range of 95% to 97%. In some aspects, the charger plug includes a data structure indicating an identifier for the connector 140 (.e.g., Cable ID) and other miscellaneous drivers for operation of the charger plug. The input to the electronic device 130 may be about two times the battery operational voltage (e.g., $2*V_{bat}$). The charger 132 of the electronic device 130 may house a capacitive buck converter (e.g., 301) that provides a 2:1 step-down conversion with about 97% efficiency. For a non-proprietary cable, the charger 132 may use a parallel inductive buck, where the maximum charging current may be in the range of 2 amperes to 3 amperes.

The charging architecture 500 provides several advantages over traditional charging architectures. For example, the adapter 110 may be a non-custom adapter such that only the connector 140 may be custom in order to perform fast charging. Given that the cable (e.g., connector 140) may only need to carry about 3 amperes of current, a standard cable may be implemented without much heat dissipation. Other cable-related integrated circuits can be integrated within the charger plug architecture. In this respect, the overall power dissipation and system cost can be reduced using the charging architecture 500. However, the charger plug may need to dissipate power in the range of 700 mW to 1.2 W. Additionally, the PWB area of the charger plug may need to increase as well due to the additional circuitry.

Figure 6:
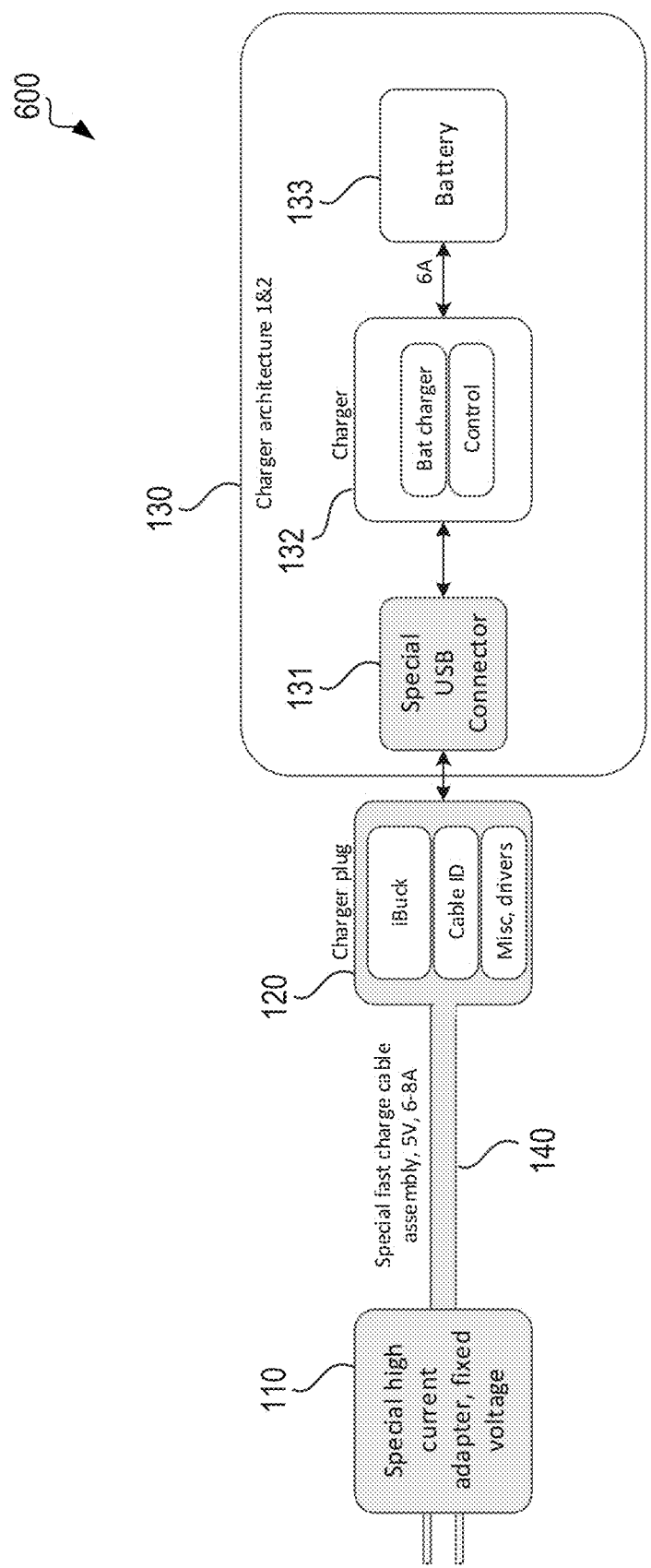
FIG. 6 illustrates an example of a charging architecture with a high current connector in accordance with one or more implementations.

FIG. 6 illustrates an example of a charging architecture with a high current connector in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The charging architecture 600 of FIG. 6 contains components similar to those shown in the charging architecture 500 of FIG. 5. The charging architecture 600 includes the connector 140 coupled to an enhanced version of the adapter 110 on one end of the connector 140 and coupled to the charger plug on the opposite end of the connector 140. The adapter 110 and the connector 140 may be type-C USB components, where the adapter 110 is configured to provide a high output current at a fixed voltage. The connector 140 may support a current in the range of 6 amperes to 8 amperes. The voltage applied to the connector 140 may be about 5 V.

The charger plug includes the inductive buck converter (e.g., 121) that operates at a relative low voltage with an efficiency in the range of 95% to 97%. The charger efficiency on the electronic device 130 may be about 98%. In FIG. 6, the charger 132 includes a charger architecture similar to the charger architecture 200 of FIG. 2, where the charger 132 may provide a fast charge path using a programmable voltage or a fixed current. The device connector 131 of the electronic device 130 may be a special connector to support the high output current from the adapter 110 while minimizing any conduction losses through the conduction path in the electronic device 130. For a non-proprietary cable, the charger 132 may use a parallel inductive buck, where the maximum charging current may be in the range of 2 amperes to 3 amperes.

Figure 7:
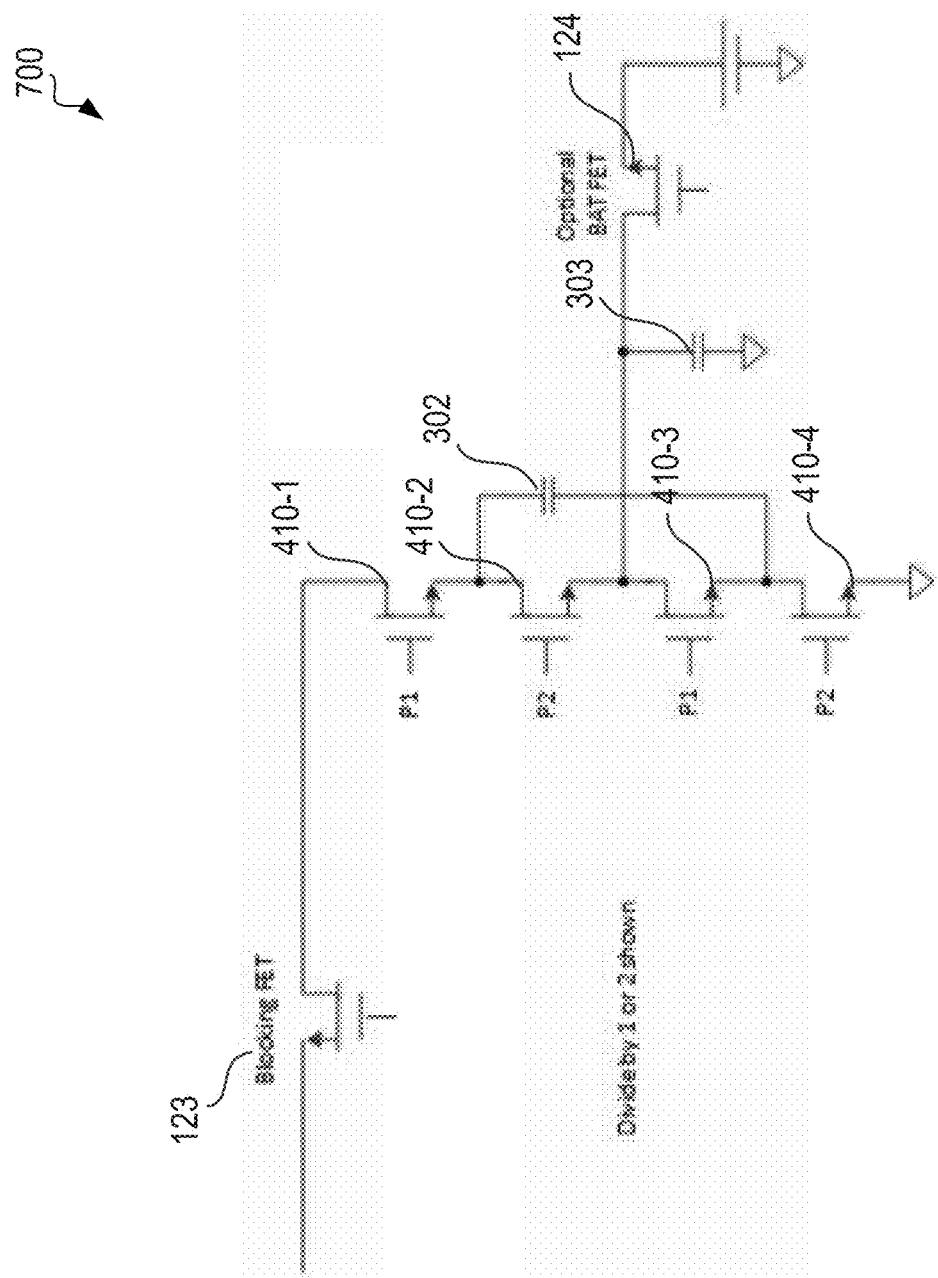
FIG. 7 illustrates an example of a switching capacitive converter architecture in accordance with one or more implementations.

FIG. 7 illustrates an example of a switching capacitive converter architecture 700 in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The switching capacitive converter architecture 700 of FIG. 7 contains components similar to those shown in the capacitive buck converter 401 of FIG. 4. The switching capacitive converter architecture 700 may depict a charge pump that supports a voltage divider operation (e.g., divide-by-two) to down-convert (or step-down) an input voltage. The voltage divider operation may support a divide ratio of 2 or any other arbitrary number depending on implementation. The divide ratio may vary in the range of 1, 3, 2/3, 4, etc. if the switching capacitive converter architecture 700 is extended with additional floating capacitors.

In FIG. 7, the switching capacitive converter architecture 700 uses transistors (e.g., MOSFETS) as the switching device(s) to control the connection of voltages to the capacitor 302. For instance, a two-stage cycle can be used to generate a higher pulsed voltage from a lower-voltage supply. In the first stage of the cycle, the capacitor 302 may be connected across the supply, charging it to that same voltage. For example, the transistors P1 (e.g., 410-1) and P3 (e.g., 410-3) may be closed and the transistors P2 (e.g., 410-2) and P4 (e.g., 410-4) are open. In the second stage of the cycle, the circuit is reconfigured so that the capacitor 302 is in series with the supply to the load (e.g., the battery 133). For example, the transistors P1 and P3 may be open and the transistors P2 and P4 are closed. In some aspects, it may be advantageous to switch the divide ratio depending on the charger input capabilities, the cable input capabilities, etc. The use of a charge pump as depicted in FIG. 7 for battery charging from a wall adapter (e.g., 110), where either voltage control or constant current modes may still apply.

Figure 8A:
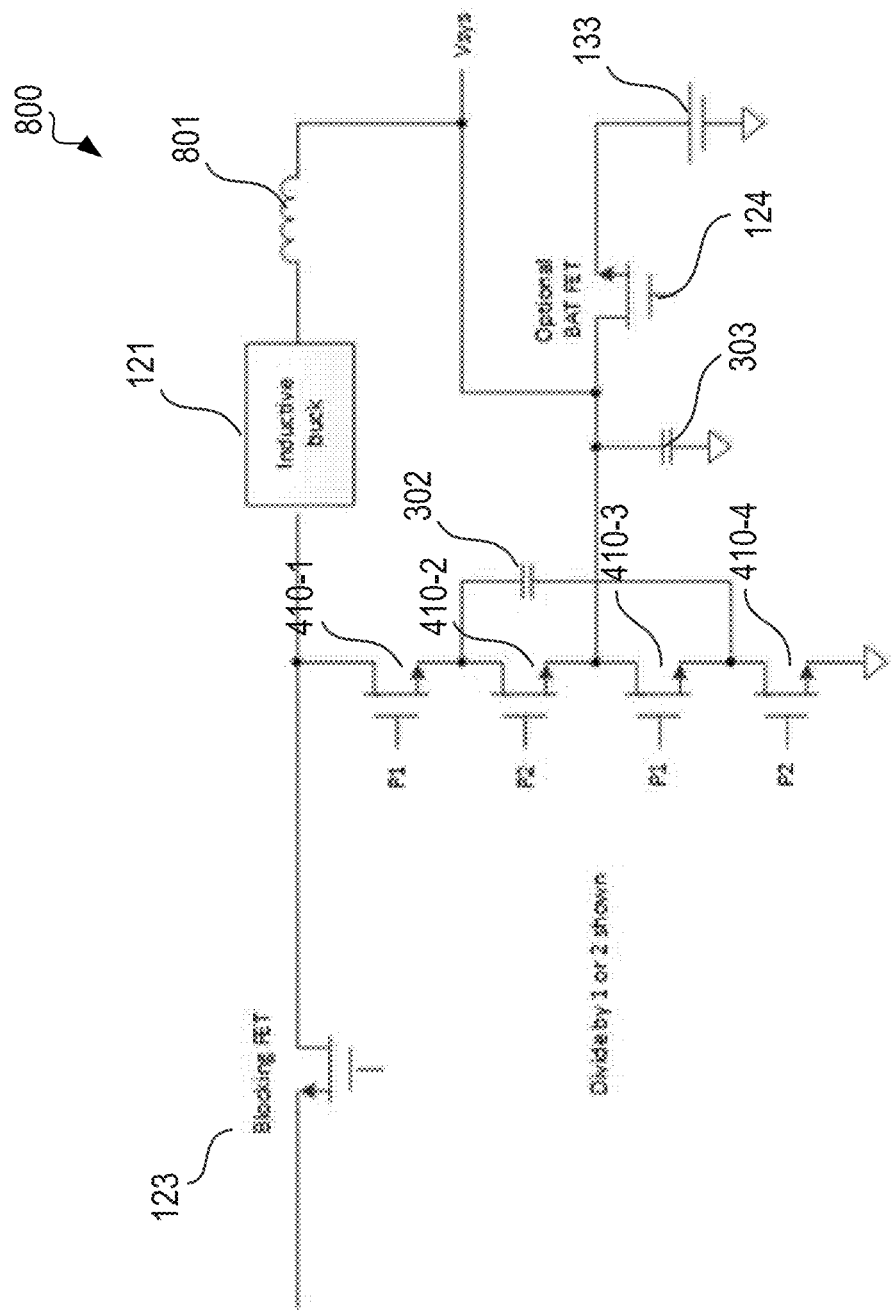
FIGS. 8A and 8B illustrate examples of a switching capacitive converter architecture in accordance with one or more implementations.

FIG. 8A illustrates an example of a switching capacitive converter architecture 800 in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The switching capacitive converter architecture 800 contains components similar to those shown in the switching capacitive converter architecture 700 of FIG. 7. In the switching capacitive converter architecture 800, the pass gate 124 is moved to improve efficiency. In FIG. 8A, the pass gate 124 is coupled in series between the output system voltage $V_{sys}$ and the load (e.g., the battery 133). In particular, the drain node of the pass gate 124 is coupled directly to the output capacitor 303, and the source node of the pass gate 124 is coupled directly to the load. The pass gate 124 may be used to fine control (or tune) the battery charge current $I_{CHG}$, especially when the battery voltage $V_{BAT}$ is low and a higher $V_{sys}$ is needed, e.g., "charge and play" functionality.

The switching capacitive converter architecture 800 also includes an inductor 801 coupled in series to the output of the inductive buck converter 121. In some implementations, the inductor 801 is part of the inductive buck converter 121. The output system voltage $V_{sys}$ may be tapped from a node located between the inductor and the pass gate 124.

Figure 8B:
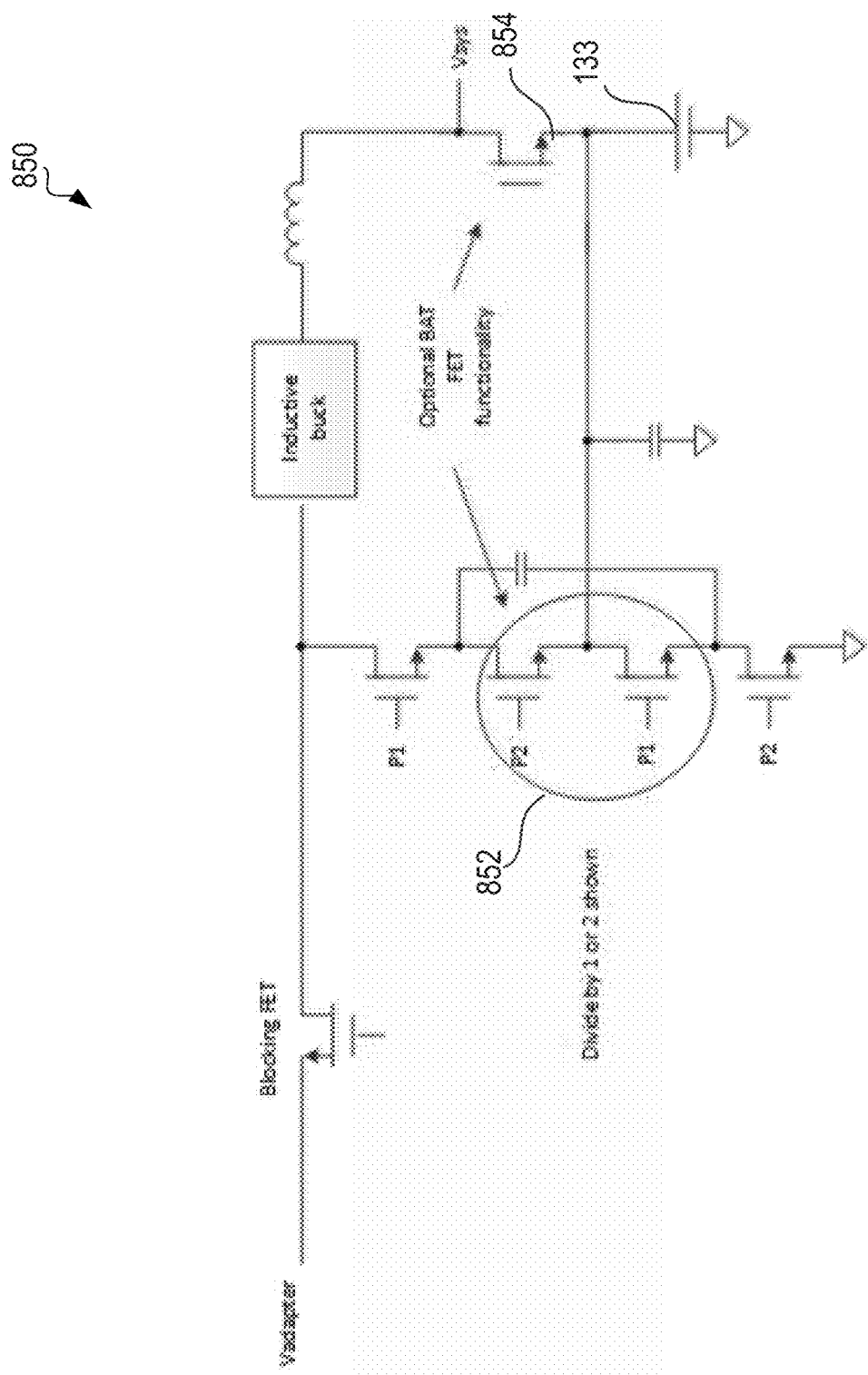

FIG. 8B illustrates an example of a switching converter architecture 850 in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The switching capacitive converter architecture 850 contains components similar to those shown in the switching capacitive converter architecture 800 of FIG. 8A. In the switching capacitive converter architecture 850, the drain node of the pass gate 124 is coupled directly to the output system voltage $V_{sys}$, and the source node of the pass gate 124 is coupled directly to the output capacitor 303 and the load 133. In some aspects, the pass gate functionality can be replicated within the control of the switches 410-2 and 410-3 (identified by element 852), including an additional switch transistor (e.g., 854) between the load (e.g., the battery 133) and the output system voltage $V_{sys}$.

In FIG. 8B, the switching capacitive converter architecture 850 can control the resistance during normal charge pump switching by changing the number of transistor fingers (e.g., a transistor finger comprised of switches 410-1, 410-2, 410-3, 410-4) or gate voltage, for example. The switching capacitive converter architecture 850 also may control the transistor duty cycle as well as the charge pump switching frequency to also adjust the charge current. In some aspects, the switching capacitive converter architecture 850 may adjust the flying capacitor values to further adjust the charge current.

FIGS. 9A and 9B illustrate examples of an integrated charger architecture 900 in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The integrated charger architecture 900 contains components similar to those shown in the switching capacitive converter architecture 800 of FIG. 8A. The integrated charger architecture 900 includes a capacitive buck converter serving as a charge pump that is very efficient if the input/output voltages can meet the desired divide ratio (e.g., two). Otherwise, the efficiency of the integrated charger architecture 900 may decrease rapidly.

Besides having an inductive buck converter applied in parallel as previously illustrated in FIG. 3, the inductive buck converter can be combined with the capacitive buck converter by using one or more of the transistors of the capacitive buck converter (e.g., 410-1, 410-2, 410-3, 410-4) in order to save semiconductor die area. The gate signals of the respective transistors (e.g., P1, P2, P3, P4) may need to controlled to reach the desired output voltage/current. In some aspects, the highest efficiency for the integrated charger architecture 900 can be achieved when the input voltage is about four times the expected battery operational voltage $V_{bat}$ (e.g., $V_{adapter} \sim = 4*V_{bat}$).

In FIG. 9A, the transistors 410-1, 410-2, 410-3, 410-4 may be configured to drive both the capacitive buck converter and inductive buck converter at different cycles of operation, where the duty cycles of the transistors are adjusted to operate over non-overlapped segments of time. In this respect, the inductive buck converter may co-exist with the capacitive buck converter by sharing the transistors 410-3 and 410-4. The node between the transistors 410-3 and 410-4 is coupled to an inductor 901 to complete the inductive buck converter circuit. In this example, the inductor 901 may be charged in a same cycle as that of the capacitor 302. In FIG. 9B, an integrated converter architecture 950 includes the inductor 901 coupled directly to a node that is located between the transistors 410-2 and 410-3 to complete the inductive buck converter circuit. In this example, the inductor 901 may be charged in a different cycle as that of the capacitor 302.

Figure 10:
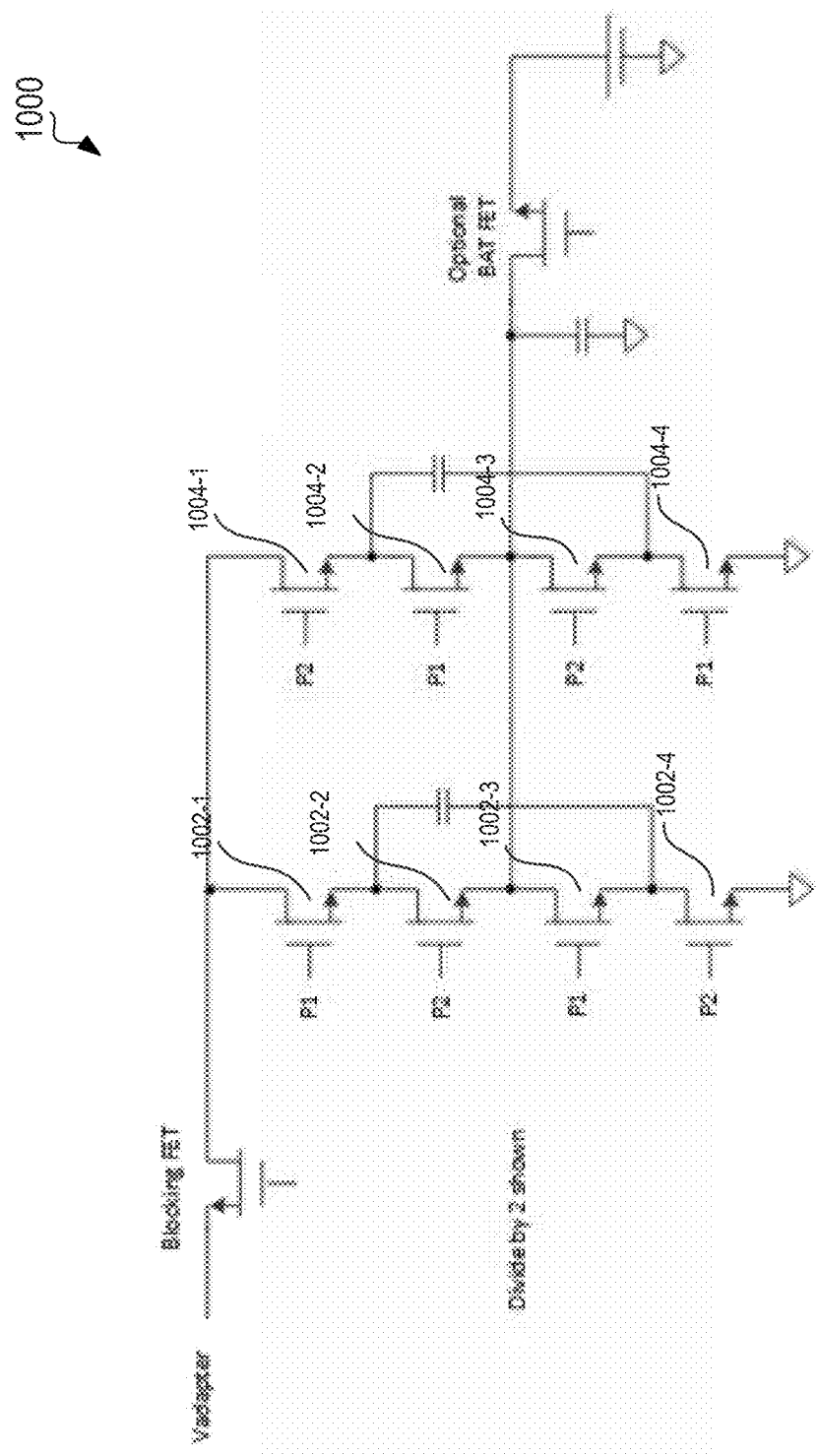
FIG. 10 illustrates an example of a multi-phase charger architecture in accordance with one or more implementations.

FIG. 10 illustrates an example of a multi-phase charger architecture 1000 in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The capacitive buck converter 301 can be multi-phased, where multiple instances of the capacitive buck converter 301 run in parallel of one another with different phases. The multi-phase charger architecture 1000 provides several advantages over a single phase capacitive buck converter, including but not limited to, reducing peak currents in the pass gate power paths and reducing ripple currents in the input, float or output capacitors and input filter requirements. In FIG. 10, the transistors 1002-1, 1002-2, 1002-3, and 1002-4 constitute a first transistor finger, and the transistors 1004-1, 1004-2, 1004-3, and 1004-4 constitute a second transistor finger. The gate signals (e.g., P1, P2) may be 180 degrees out of phase. The phases of the gate signals between the first transistor finger and the second transistor finger may be different. For example, the second transistor finger may include different gate signals (e.g., P3, P4) that may be 180 degrees out of phase with respect to each other, and may be out phase with respect to the gate signals of the first transistor finger (e.g., P1, P2). The gate signals (e.g., P3, P4) may be 180 degrees out of phase to improve the input voltage ripple at the input of the capacitive buck converter 301 in some implementations, and the gate signals (e.g., P3, P4) may be 90 degrees out of phase to improve the ripple current at the output of the capacitive buck converter 301 in other implementations. The capacitive buck converter 301 may include a programmable delay circuit (not shown) that is coupled to the gate signals of the second transistor finger and sets the phase between the P1/P2 branch and the P3/P4 branch. Using the programmable delay circuit, the phases between the first and second transistor fingers may be set to 0 degrees, 90 degrees, or 180 degrees depending on implementation. In some aspects, the first and second transistor fingers may be formed on a same semiconductor die (or same silicon area). Having the first and second transistor fingers coupled in parallel to form a dual phase capacitive buck converter can provide higher efficiency over a single phase capacitive buck converter (e.g., 401).

Figures 11A, 11B:
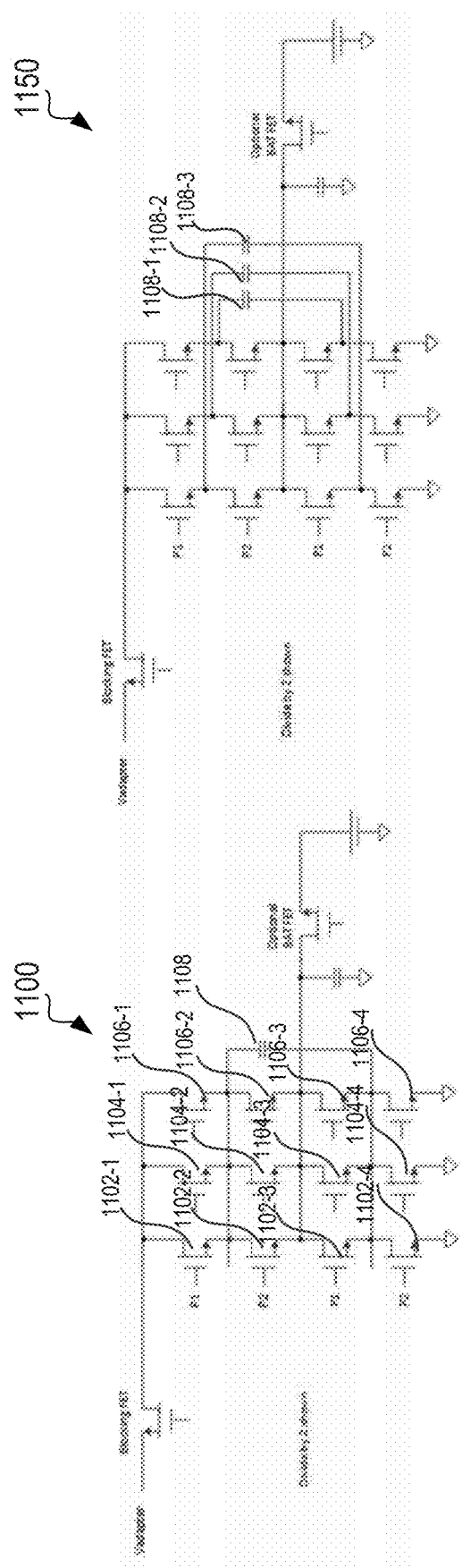
FIGS. 11A and 11B illustrate examples of a scalable charger architecture in accordance with one or more implementations.

FIGS. 11A and 11B illustrate examples of a scalable charger architecture in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The switching transistors of a scalable charger architecture 1100 can break up each transistor into respective fingers, such that one or more transistor fingers can be turned on to reduce the equivalent output resistance of the capacitive buck converter. The transistors may be equal in size in some implementations, or may vary in size in other implementations. In some aspects, during light loads, it may be desirable to use only one transistor finger for each transistor (or switch) to minimize switching power. Besides changing frequency, the output impedance can be changed by adjusting the transistor fingers (by resistance) and/or flyback capacitance. Adjusting the output impedance is useful to control the output voltage or current.

In FIG. 11A, a capacitor 1108 is coupled to each of the transistor fingers. The capacitor 1108 is coupled to a first transistor finger comprised of transistors 1102-1, 1102-2, 1102-3 and 1102-4. The capacitor 1108 is also coupled to a second transistor finger comprised of transistors 1104-1, 1104-2, 1104-3 and 1104-4. The capacitor 1108 is coupled to a third transistor finger comprised of transistors 1106-1, 1106-2, 1106-3 and 1106-4. Each of the transistor fingers may be individually controlled depending on the duty cycle applied to each of the gate nodes of the transistors. For example, the duty cycle applied to the gate node of the transistor 1102-1 may be different from the duty applied to the gate node of the transistors 1104-1 and/or 1106-1. In FIG. 11B, a scalable charger architecture 1150 includes multiple instances of the capacitor 1108 depicted as capacitors 1108-1, 1108-2 and 1108-3, which are coupled respectively to the first transistor finger, the second transistor finger and the third transistor finger. In this implementation, the output impedance can be changed by increasing the equivalent capacitance based on the number of transistor fingers being turned on.

Figure 12:
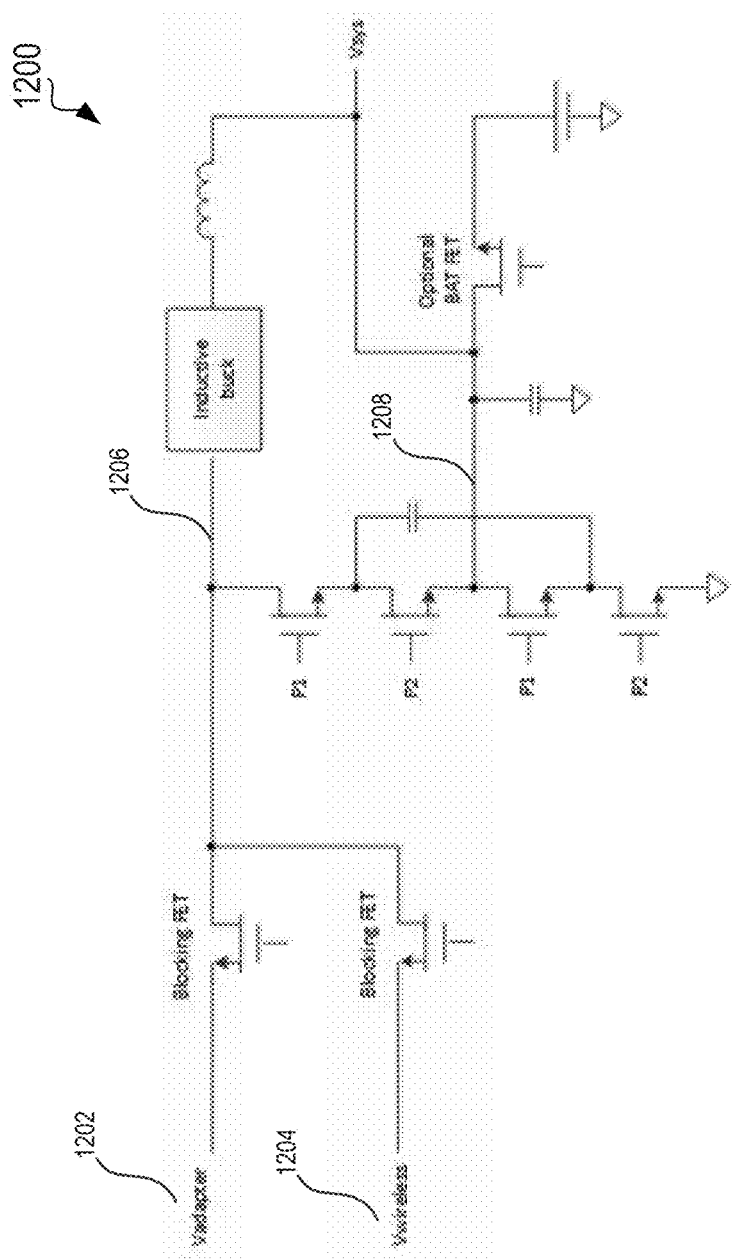
FIG. 12 illustrates an example of a dual input charger architecture in accordance with one or more implementations.

FIG. 12 illustrates an example of a dual input charger architecture 1200 in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

Electrical products may have an input source that is a wired adapter. In other aspects, the electrical products also may have an input source that is from a wireless adapter. In this respect, the dual input charger architecture 1200 can support dual types of input (e.g., wired, wireless). For highest efficiency, a capacitive buck design can be implemented so long as input conditions as described in FIG. 3 can be maintained. The capacitive buck divide ratios can be adaptable to provide a divide-by-two or any other arbitrary divide ratio depending on implementation. If the input voltage is not near a desirable divide ratio, then an inductive buck converter may be used instead.

Wireless power systems can control their output voltage during a steady state operation in most cases so this can improve efficiency over a traditional buck converter. In some aspects, there is a control channel from the electrical product to a radio power transmitter to adjust the system voltages dynamically. In some implementations, the system voltages are adjusted as a function of the battery operational voltage.

In FIG. 12, there are two paths (e.g., 1206, 1208) available for supplying the charge current to the battery (e.g., 133). If the input voltage is adaptable to provide the charge current, then the path through the capacitive buck converter (e.g., 1208) can be selected. Otherwise, for a non-adaptable input voltage, the path through the inductive buck converter (e.g., 1206) can be selected.

Figure 13:
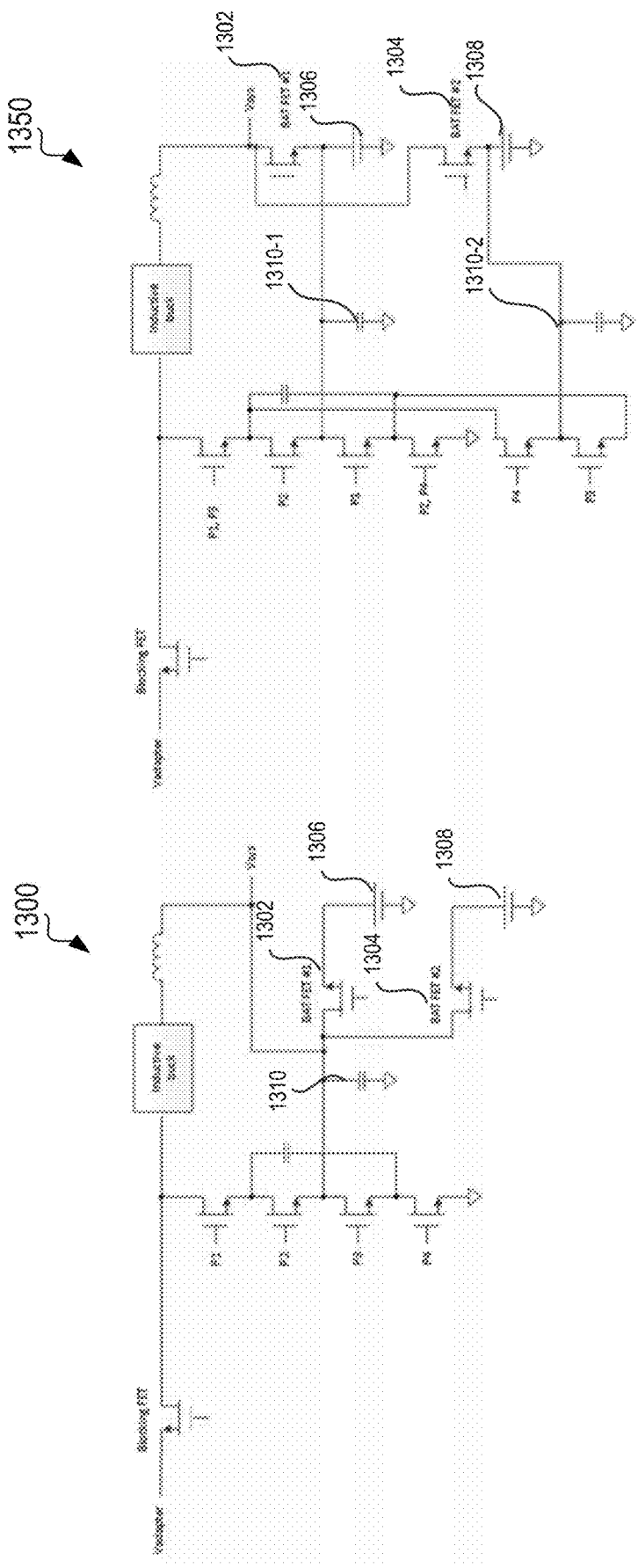
FIGS. 13A and 13B illustrate examples of a dual output charger architecture in accordance with one or more implementations.

FIGS. 13A and 13B illustrate examples of a dual output charger architecture in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The dual output charger architecture can charge two or more batteries at the same time. In FIG. 13A, a dual output charger architecture 1300 includes pass transistors (e.g., 1302, 1304) configured to control the charge current difference to the respective loads (e.g., 1306, 1308). The drain nodes of the pass transistors 1302, 1304 are coupled directly to the system voltage output, and the source nodes of the pass transistors 1302, 1304 are respective coupled to loads 1306 and 1308.

In FIG. 13B, a dual output charger architecture 1350 includes the drain nodes of the pass transistors 1302, 1304 coupled directly to the system voltage output, and the source nodes of the pass transistors 1302, 1304 respective coupled to the output capacitors 1310-1 and 1310-2 and respectively coupled to the loads 1306 and 1308. In this implementation, the capacitive buck converter can control both charge currents (e.g., respective currents to the loads 1306 and 1308). The dual output charger architecture 1350 may reuse the flyback capacitor to send voltage/current to each battery separately. The charge currents to the loads 1306 and 1308 can be controlled by controlling the control signals P1-P4 to the gate nodes of the transistor switches, the duty cycle of each transistor switch and the output resistance/frequency components of the transistor switches.

Figure 14:
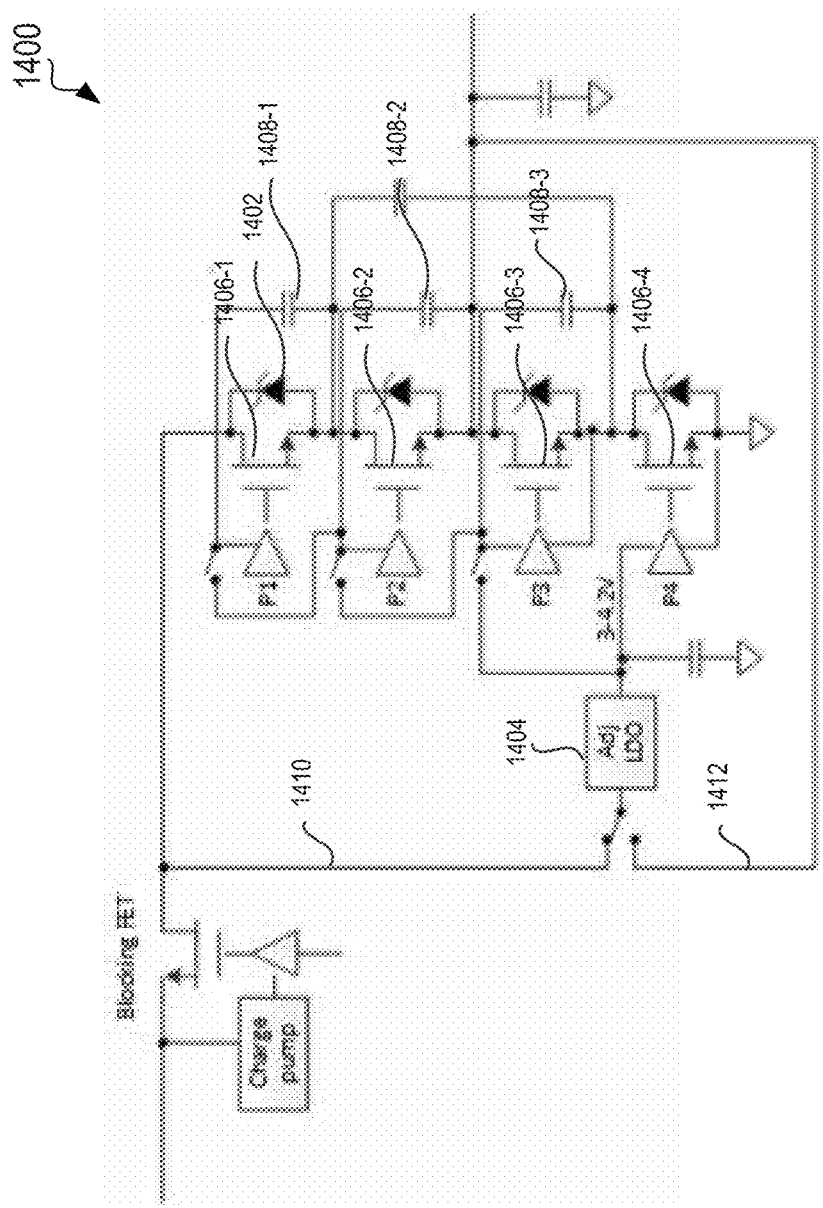
FIG. 14 illustrates an example of a low voltage transistor based charger architecture in accordance with one or more implementations.

FIG. 14 illustrates an example of a low voltage transistor based charger architecture 1400 in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

In FIG. 14, the charger architecture 1400 may utilize low voltage transistors for the capacitive buck converter by keeping the drain-to-source voltage ($V_{ds}$) below a maximum voltage using a diode such as a Zener diode (e.g., 1402) or the like across the channel of each series-connected transistor (e.g., 1406-1, 1406-2, 1406-3, 1406-4). The gate-to-source voltage (Vgs) can be kept below a maximum voltage as well by implementing a DC linear voltage regulator (e.g., 1404) such as a low-dropout (LDO) circuit coupled to the gate node of each series-connected transistor. At start-up, each of the series-connected transistors is turned on in sequence, where the bottom-most transistor (e.g., 1406-4) is turned on first. In this case, multiple transistor switches can turn on at the same time until all the gate-node capacitors (e.g., 1408-1, 1408-2, 1408-3) are primed (e.g., charged to a predetermined energy level). For best power savings in the charger architecture 1400, the gate voltage (Vgs) may be adjustable and be powered from the input (e.g., 1410) during start-up, but driven from the output (e.g., 1412) once the system is operational.

The efficiency of the charger architectures can be improved by considering other implementations. For example, a hysteric capacitive buck type design can be implemented, where a target output voltage is monitored. If the output voltage is below a target threshold, then the capacitive buck converter can be turned on for one P1/P2 cycle pair repetitively until the output voltage is at or at least above the target threshold. In other aspects, a dynamic control system can be implemented, where the switching frequency is increased or decreased depending on whether the output voltage is above or below a target threshold. In other aspects, the output load current can be estimated by monitoring the transistor driver currents via current mirror transistors. In this respect, the monitored currents can be integrated over one or more cycles to get instantaneous current readings or average current readings.

Figure 15:
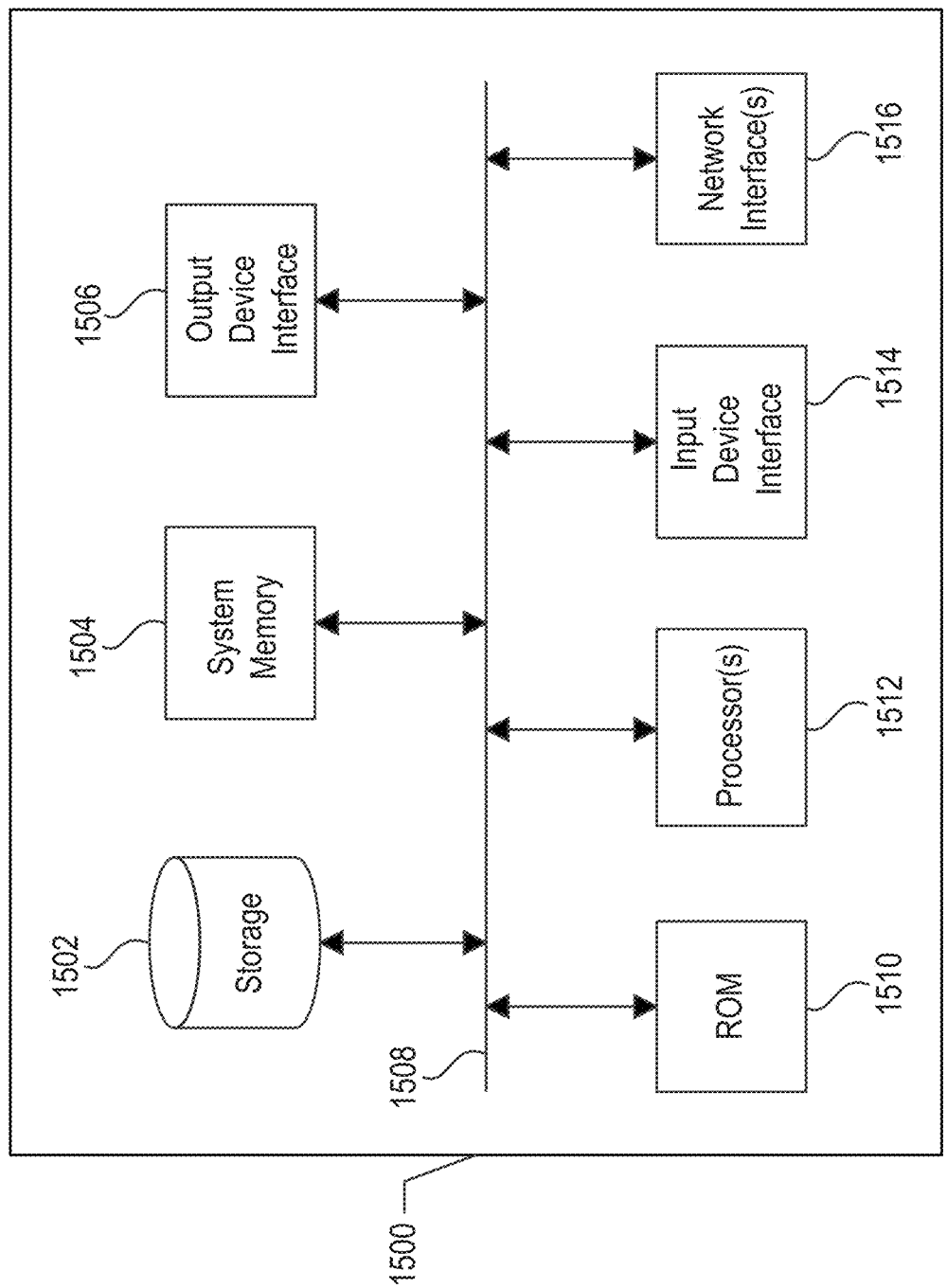
FIG. 15 conceptually illustrates an electronic system with which one or more implementations of the subject technology may be implemented.

FIG. 15 conceptually illustrates an electronic system 1500 with which one or more implementations of the subject technology may be implemented. The electronic system 1500, for example, can be a network device, a media converter, a desktop computer, a laptop computer, a tablet computer, a server, a switch, a router, a base station, a receiver, a phone, or generally any electronic device that transmits signals over a network. Such an electronic system 1500 includes various types of computer readable media and interfaces for various other types of computer readable media. In one or more implementations, the electronic system 1500 may be, or may include, the adapter, charger, etc. of FIGS. 1A and 1B. The electronic system 1500 includes a bus 1508, one or more processing unit(s) 1512, a system memory 1504, a read-only memory (ROM) 1510, a permanent storage device 1502, an input device interface 1514, an output device interface 1506, and a network interface 1516, or subsets and variations thereof.

The bus 1508 collectively represents all system, peripheral, and chipset buses that communicatively connect the numerous internal devices of the electronic system 1500. In one or more implementations, the bus 1508 communicatively connects the one or more processing unit(s) 1512 with the ROM 1510, the system memory 1504, and the permanent storage device 1502. From these various memory units, the one or more processing unit(s) 1512 retrieves instructions to execute and data to process in order to execute the processes of the subject disclosure. The one or more processing unit(s) 1512 can be a single processor or a multi-core processor in different implementations.

The ROM 1510 stores static data and instructions that are needed by the one or more processing unit(s) 1512 and other modules of the electronic system. The permanent storage device 1502, on the other hand, is a read-and-write memory device. The permanent storage device 1502 is a non-volatile memory unit that stores instructions and data even when the electronic system 1500 is off. One or more implementations of the subject disclosure use a mass-storage device (such as a magnetic or optical disk and its corresponding disk drive) as the permanent storage device 1502.

Other implementations use a removable storage device (such as a floppy disk, flash drive, and its corresponding disk drive) as the permanent storage device 1502. Like the permanent storage device 1502, the system memory 1504 is a read-and-write memory device. However, unlike the permanent storage device 1502, the system memory 1504 is a volatile read-and-write memory, such as random access memory. System memory 1504 stores any of the instructions and data that the one or more processing unit(s) 1512 needs at runtime. In one or more implementations, the processes of the subject disclosure are stored in the system memory 1504, the permanent storage device 1502, and/or the ROM 1510. From these various memory units, the one or more processing unit(s) 1512 retrieves instructions to execute and data to process in order to execute the processes of one or more implementations.

The bus 1508 also connects to the input device interface 1514 and the output device interface 1506. The input device interface 1514 enables a user to communicate information and select commands to the electronic system. Input devices used with the input device interface 1514 include, for example, alphanumeric keyboards and pointing devices (also called "cursor control devices"). The output device interface 1506 enables, for example, the display of images generated by the electronic system 1500. Output devices used with the output device interface 1506 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 15, the bus 1508 also couples the electronic system 1500 to one or more networks (not shown) through one or more network interfaces 1516. In this manner, the computer can be a part of one or more network of computers, such as a peer-to-peer network, a local area network ("LAN"), a wide area network ("WAN"), or an Intranet, or a network of networks, such as the Internet. Any or all components of the electronic system 1500 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A system, comprising:
    an adapter configured to receive an alternating current (AC) signal and generate an adapter signal, the adapter signal being generated based on an up-conversion of the AC signal;
    a charger configured to generate a direct current (DC) signal from the adapter signal using one or more energy storage elements and supply the DC signal to a load, the adapter signal having a voltage greater than that of the DC signal, wherein the charger comprises a plurality of switches coupled to at least one of the one or more energy storage elements, a first subset of switches of the plurality of switches being coupled in series with the at least one of the one or more energy storage elements and a second subset of switches of the plurality of switches being coupled in parallel to the at least one of the one or more energy storage elements; and
    a connector configured to couple the adapter and the charger,
    wherein the adapter signal is adjusted based on one or more measurements of the DC signal at an output of the charger to maintain a target power for charging the load, wherein the one or more energy storage elements comprise a first capacitor, a second capacitor, and an inductor, wherein the first capacitor and the second capacitor are directly connected to a first node and a second node of the inductor, and wherein the adapter signal is downconverted to the DC signal based on a divide ratio.

2. The system of claim 1, wherein the at least one of the one or more energy storage elements is electrically coupled to the load via different conduction paths during different switching phases based on phase transitions between switches of the plurality of switches.

3. The system of claim 1, wherein the charger comprises an output energy storage element coupled to the plurality of switches and to the load, and wherein the divide ratio is adjusted based on a change in a number of the one or more energy storage elements coupled in series with the output energy storage element during a first switching phase.

4. The system of claim 3, wherein the divide ratio is adjusted based on a change in the number of the one or more energy storage elements coupled in parallel to the output energy storage element during a second switching phase.

5. The system of claim 1, wherein the charger further comprises a first controller circuit, wherein an on or off state of each of the plurality of switches is based on one or more control signals from the first controller circuit.

6. The system of claim 1, wherein the charger comprises:
    a first switching converter that includes one or more capacitors on a first charge path to the load; and
    a second switching converter that includes one or more inductors on a second charge path to the load, the DC signal being applied to the first charge path with a first voltage and to the second charge path with a second voltage that is smaller than the first voltage, the DC signal being supplied to the load via the first charge path and the second charge path at different times.

7. The system of claim 6, wherein the charger further comprises:

a first pass gate coupled to an input to the first switching converter and to the connector, the first pass gate being turned on during a charging phase of the load; and a second pass gate coupled to an output of the first switching converter and to the load, the second pass gate being configured to change an impedance of a charge path from the output of the first switching converter to the load to control a charge current to the load.

8. The system of claim 7, wherein the charger further comprises a second controller circuit, wherein an on or off state of second pass gate is based on one or more control signals from the second controller circuit.

9. The system of claim 6, wherein the first switching converter is coupled in parallel to the second switching converter.

10. The system of claim 6, wherein the first switching converter comprises a plurality of serially-connected switches.

11. The system of claim 6, wherein the first switching converter is configured to supply a first charge current to the load based on the DC signal that is greater than a second charge current supplied by the second switching converter.

12. The system of claim 6, wherein the second switching converter comprises:
a transistor network; and
an inductor coupled in series with an output of the transistor network.

13. The system of claim 12, wherein the charger further comprises a third controller circuit, wherein an on or off state of the transistor network is based on one or more control signals from the third controller circuit.

14. A method, comprising:
receiving an alternating current (AC) signal from an AC source;
generating, by an adapter, an adapter signal based on an up-conversion of the AC signal;
applying the adapter signal to a connector coupled to a charger module;
generating, by a charger circuit, a direct current (DC) signal from the adapter signal using one or more energy storage elements of the charger module, the adapter signal having a voltage greater than that of the DC signal; and
supplying the DC signal to a load,
wherein the charger circuit comprises a plurality of switches coupled to at least one of the one or more energy storage elements, a first subset of switches of the plurality of switches being coupled in series with the at least one of the one or more energy storage elements and a second subset of switches of the plurality of switches being coupled in parallel to the at least one of the one or more energy storage elements,
wherein the adapter signal is adjusted based on one or more measurements of the DC signal at an output of the charger module to maintain a target power for charging the load, and wherein the one or more energy storage elements comprise a first capacitor, a second capacitor and an inductor, wherein the first capacitor and the second capacitor are directly connected to a first node and a second node of the inductor, and
wherein the adapter signal is downconverted to the signal based on a divide ratio.

15. The method of claim 14, wherein the at least one of the one or more energy storage elements is electrically coupled to the load via different conduction paths during different switching phases based on phase transitions between the first subset of switches and the second subset of switches.

16. The method of claim 14, further comprising:
coupling an output energy storage element to the plurality of switches and to the load;
adjusting the divide ratio based on a change in a number of the one or more energy storage elements coupled in series with the output energy storage element during a first switching phase; and
adjusting the divide ratio based on a change in the number of the one or more energy storage elements coupled in parallel to the output energy storage element during a second switching phase.

17. The method of claim 14, further comprising:
receiving one or more control signals from a controller circuit; and
controlling, based on the one or more control signals, an on or off state of each of the plurality of switches.

18. A system comprising:
an adapter configured to generate an adapter signal based on an up-conversion of an AC signal; and
a charger coupled to the adapter and configured to generate a direct current (DC) signal from the adapter signal using one or more energy storage elements and supply the DC signal to a load, the adapter signal having a voltage greater than that of the DC signal, wherein the charger comprises a plurality of switches coupled to at least one of the one or more energy storage elements, a first subset of switches of the plurality of switches being coupled in series with the at least one of the one or more energy storage elements and a second subset of switches of the plurality of switches being coupled in parallel to the at least one of the one or more energy storage elements,
wherein the one or more energy storage elements comprise a first capacitor, a second capacitor, and an inductor, wherein the first capacitor and the second capacitor are directly connected to a first node and a second node of the inductor,
wherein the adapter signal is downconverted to the DC signal based on a divide ratio, and
wherein the adapter signal is adjusted based on one or more measurements of the DC signal at an output of the charger to maintain a target power for charging the load.

19. The system of claim 18, wherein the charger comprises an output energy storage element coupled to the plurality of switches and to the load, wherein the divide ratio is adjusted based on a change in a number of the one or more energy storage elements coupled in series with the output energy storage element during a first switching phase, and wherein the divide ratio is adjusted based on a change in the number of the one or more energy storage elements coupled in parallel to the output energy storage element during a second switching phase.

20. The system of claim 18, wherein the charger further comprises a controller circuit, wherein an on or off state of each of the plurality of switches is controlled based on one or more control signals from the controller circuit.

* * * * *

UNITED STATES PATENT AND TRADEMARK OFFICE
CERTIFICATE OF CORRECTION

PATENT NO. : 11,101,674 B2
APPLICATION NO. : 15/669859
DATED : August 24, 2021
INVENTOR(S) : Walley et al.

Page 1 of 1

It is certified that error appears in the above-identified patent and that said Letters Patent is hereby corrected as shown below:

In the Claims

Column 21, Line 63 (Claim 14): Replace "downconverted to the signal", with --downconverted to the DC signal--.

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*